US012550219B2

(12) United States Patent
Lee et al.

(10) Patent No.: US 12,550,219 B2
(45) Date of Patent: Feb. 10, 2026

(54) ELECTRONIC APPARATUS, CONTROL DEVICE, AND OPERATING METHODS OF THE SAME

(71) Applicant: SAMSUNG ELECTRONICS CO., LTD., Suwon-si (KR)

(72) Inventors: Wonjae Lee, Suwon-si (KR); Kwanyoung Kim, Suwon-si (KR); Minsup Kim, Suwon-si (KR); Kihyun Song, Suwon-si (KR); Sukhoon Yoon, Suwon-si (KR); Jongkeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 545 days.

(21) Appl. No.: 18/079,339

(22) Filed: Dec. 12, 2022

(65) Prior Publication Data

US 2023/0110222 A1 Apr. 13, 2023

Related U.S. Application Data

(63) Continuation of application No. PCT/KR2022/012748, filed on Aug. 25, 2022.

(30) Foreign Application Priority Data

Sep. 13, 2021 (KR) .................. 10-2021-0122068

(51) Int. Cl.
*H04W 76/19* (2018.01)
*H02J 50/10* (2016.01)
(Continued)

(52) U.S. Cl.
CPC ............ *H04W 76/19* (2018.02); *H02J 50/10* (2016.02); *H02J 50/80* (2016.02); *H04W 76/30* (2018.02)

(58) Field of Classification Search
CPC .................. H02J 50/00; H02J 50/80
See application file for complete search history.

(56) References Cited

U.S. PATENT DOCUMENTS

| 8,553,159 B2 | 10/2013 | Carmichael |
| 10,587,150 B1 | 3/2020 | Elangovan et al. |

(Continued)

FOREIGN PATENT DOCUMENTS

| JP | 2020-07802 | 5/2020 |
| KR | 10-0691761 | 2/2007 |

(Continued)

OTHER PUBLICATIONS

International Search Report and Written Opinion of the ISA for PCT/KR2022/012748 dated Nov. 28, 2022, 10 pages.

(Continued)

*Primary Examiner* — Wen W Huang
(74) *Attorney, Agent, or Firm* — NIXON & VANDERHYE P.C.

(57) ABSTRACT

An electronic apparatus, a control device, an operating method of the electronic apparatus, and/or an operating method of the control device. An electronic apparatus may include a communication interface, a memory, and a processor, in which the processor may be configured to, based at least on identifying a control device that is communication-connected, control to transmit a wireless signal of a first intensity for power charging of the control device, based at least on detection of a predetermined event, change the wireless signal of the first intensity to/into a wireless signal of a second intensity that is greater than the first intensity, and control transmit the wireless signal of the second intensity to the control device, in response to the wireless signal of the second intensity being transmitted, receive a communication reconnection request from the control device, and in response to the communication reconnection (Continued)

request, control to establish a communication connection with the control device.

19 Claims, 11 Drawing Sheets

(51) Int. Cl.
*H02J 50/80* (2016.01)
*H04W 76/30* (2018.01)

(56) References Cited

U.S. PATENT DOCUMENTS

| | | | |
|---|---|---|---|
| 2006/0046736 A1* | 3/2006 | Pering | H04B 1/1615 455/452.2 |
| 2012/0161721 A1 | 6/2012 | Neethimanickam | |
| 2013/0215331 A1 | 8/2013 | Carmichael | |
| 2015/0288221 A1 | 10/2015 | Pan | |
| 2015/0326059 A1 | 11/2015 | Abu Qahouq | |
| 2017/0088072 A1* | 3/2017 | Curtis | G08B 31/00 |
| 2018/0262055 A1* | 9/2018 | Schoenbart | H02J 50/80 |
| 2018/0287418 A1* | 10/2018 | Zeine | H02J 50/80 |
| 2020/0287416 A1* | 9/2020 | Sauterel | G06F 3/03543 |
| 2022/0182102 A1* | 6/2022 | Park | H04B 5/79 |

FOREIGN PATENT DOCUMENTS

| | | |
|---|---|---|
| KR | 10-2011-0070636 | 6/2011 |
| KR | 10-1627465 | 5/2016 |
| KR | 10-2017-0141550 | 12/2017 |
| KR | 10-2018-0024371 | 3/2018 |
| KR | 10-2064986 | 1/2020 |
| WO | WO 2017/180110 A1 | 10/2017 |

OTHER PUBLICATIONS

Bluetooth Specification "Master Table of Contents & Compliance Requirements", Dec. 2014, 2772 pages.

* cited by examiner

ELECTRONIC APPARATUS, CONTROL DEVICE, AND OPERATING METHODS OF THE SAME

CROSS REFERENCE TO RELATED APPLICATION

This application is a continuation of International Application No. PCT/KR2022/012748 designating the United States, filed on Aug. 25, 2022, in the Korean Intellectual Property Receiving Office and claiming priority to Korean Patent Application No. 10-2021-0122068, filed on Sep. 13, 2021, the disclosures of which are all hereby incorporated herein by reference for all purposes as if fully set forth herein.

FIELD

Certain example embodiments relate to an electronic apparatus, a control device, and/or operating methods of the electronic apparatus and the control device, and for example, to an electronic apparatus, a control device, and/or operating methods of the electronic apparatus and the control device, to reduce power consumption in a communication connection between the electronic apparatus and the control device.

BACKGROUND

Classic Bluetooth is a wireless technology standard used in the exchange of data or voice within a short range. This technology is widely used to transfer data, audio, and video between devices such as smartphones, laptops, personal computer (PC) peripherals, earphones, etc. However, this Bluetooth technology is not suitable for battery-based applications that are desired to operate for a long time without battery replacement or charging, because of high current consumption. Bluetooth Low Energy (BLE) technology operates in the same spectrum as the existing Bluetooth technology, but uses channels that are different from those used in the existing Bluetooth technology. The BLE technology uses 40 2-MHz-width channels, instead of 79 1-MHz-width channels of Bluetooth technology, and uses a frequency hopping scheme to solve narrowband interference problems. Ultra-low power connectivity and basic data transmission, which have been difficult to achieve in applications due to power consumption, have become possible in such applications owing to BLE. BLE may consume extremely low-level power, realizing pure low power consumption. Devices based on the BLE technology consume low enough power to operate for several months to several years with a single general coin cell battery, such that the BLE technology may be effectively used to enable the devices to operate regardless of whether the devices are in an idle mode or a normal mode.

However, when BLE is applied to a remote controller that remotely controls a display device such as a television (TV), data transmission/reception needs to be performed at all times to maintain a BLE connection between the TV and the remote controller. Such power consumption for this data transmission/reception may not be ignored, and therefore, a scheme for further reducing power consumption may be required.

SUMMARY

Provided are an electronic apparatus, a control device, and/or operating methods of the electronic apparatus and the control device, in which a communication connection may be effectively performed while minimizing or reducing power consumption.

According to an example embodiment, an electronic apparatus may include a communication interface including interface circuitry, a memory storing one or more instructions, and a processor configured to execute the one or more instructions stored in the memory, in which the processor may be configured to, by executing the one or more instructions, based at least on identifying a control device that is communication-connected, control to transmit a wireless signal of a first intensity for power charging of the control device, based at least on detection of a predetermined/predesignated event, change a wireless signal to be transmitted to the control device from the wireless signal of the first intensity to/into a wireless signal of a second intensity that is greater than the first intensity, and control to transmit the wireless signal of the second intensity to the control device, in response to the wireless signal of the second intensity being transmitted, receive a communication reconnection request from the control device, and in response to the communication reconnection request, control to establish a communication connection with the control device.

According to an example embodiment, the wireless signal of the first intensity and the wireless signal of the second intensity may be wireless signals corresponding to different communication protocols.

According to an example embodiment, the wireless signal of the first intensity may include a Bluetooth signal of the first intensity, and the wireless signal of the second intensity may include a Wireless Fidelity (WiFi) signal of the second intensity.

According to an example embodiment, the wireless signal of the first intensity and the wireless signal of the second intensity may be wireless signals corresponding to the same communication protocol, and may have different intensities.

According to an example embodiment, the first intensity and the second intensity of the wireless signals may be determined by at least one of a strength or a transmission time interval of the wireless signals.

According to an example embodiment, the wireless signal may include a WiFi signal.

According to an example embodiment, the predetermined/predesignated event may include an event requesting an operation of a communication reconnection with the control device.

According to another embodiment, a control device includes a communication interface, a wireless charging unit, a memory storing one or more instructions, and a processor configured to execute one or more instructions stored in the memory, in which the processor may be configured to, by executing the one or more instructions, upon receiving a wireless signal of a first intensity for power charging from an electronic apparatus that is communication-connected, control the wireless charging unit to collect the wireless signal of the first intensity and to charge power, detect that an intensity of the power charged by the wireless charging unit exceeds a threshold value, based on detecting the power of the intensity exceeding the threshold value, transmit a communication reconnection request to the electronic apparatus, and receive a response to the communication reconnection request from the electronic apparatus to establish a communication connection with the electronic apparatus.

According to an example embodiment, the processor may be further configured to, by executing the one or more instructions stored in the memory, detect that the intensity of the power charged by the wireless charging unit exceeds the threshold value, when a wireless signal of a second intensity that is different from the wireless signal of the first intensity is received from the electronic apparatus.

According to an example embodiment, the processor may be further configured to, by executing the one or more instructions, release the connection with the electronic apparatus when there is no valid data transmission/reception after communication connection including pairing with the electronic apparatus.

According to another embodiment, an operating method of an electronic apparatus may include, based on identifying a control device that is communication-connected, transmitting a wireless signal of a first intensity for power charging of the control device, changing a wireless signal to be transmitted to the control device from the wireless signal of the first intensity to/into a wireless signal of a second intensity that is greater than the first intensity, according to a predetermined/predesignated event, and transmitting the wireless signal of the second intensity to the control device, and in response to the wireless signal of the second intensity being transmitted, receiving a communication reconnection request from the control device, and in response to the communication reconnection request, performing communication connection with the control device.

According to another embodiment, an operating method of a control device may include upon receiving a wireless signal of a first intensity for power charging from an electronic apparatus that is communication-connected, collecting the wireless signal of the first intensity and charging power, detecting that an intensity of the power charged by the wireless charging unit exceeds a threshold value, based on detecting the power of the intensity exceeding the threshold value, transmitting a communication reconnection request to the electronic apparatus, and receiving a response to the communication reconnection request from the electronic apparatus to establish a communication connection with the electronic apparatus.

According to an example embodiment, a computer-readable recording medium may have recorded thereon one or more programs executed by a processor of an electronic apparatus to implement an operating method of the electronic apparatus, the operating method including, based on identifying a control device that is communication-connected, transmitting a wireless signal of a first intensity for power charging of the control device, based on detection of a predetermined/predesignated event, changing a wireless signal to be transmitted to the control device from the wireless signal of the first intensity into a wireless signal of a second intensity that is greater than the first intensity, and transmitting the wireless signal of the second intensity to the control device, in response to the wireless signal of the second intensity being transmitted, receiving a communication reconnection request from the control device, and in response to the communication reconnection request, performing communication connection with the control device.

According to an example embodiment, communication connection may be effectively performed while minimizing power consumption between two devices performing the communication connection, i.e., an electronic apparatus and a control device.

According to an example embodiment, by adopting a wireless harvesting technique for the control device that controls the electronic apparatus to enable charging using a wireless signal transmitted by the electronic apparatus, the power supply of the control device may be effectively performed.

According to an example embodiment, a connection state between the electronic apparatus and the control device may be released after pairing connection between the electronic apparatus and the control device, thereby saving power consumed in the control device to maintain the connection.

According to an example embodiment, the electronic apparatus is caused to transmit a strong wireless signal to induce communication connection between the electronic apparatus and the control device, and the control device is caused to attempt reconnection to the electronic apparatus based on the strong wireless signal, thereby effectively triggering communication reconnection of the control device.

BRIEF DESCRIPTION OF DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
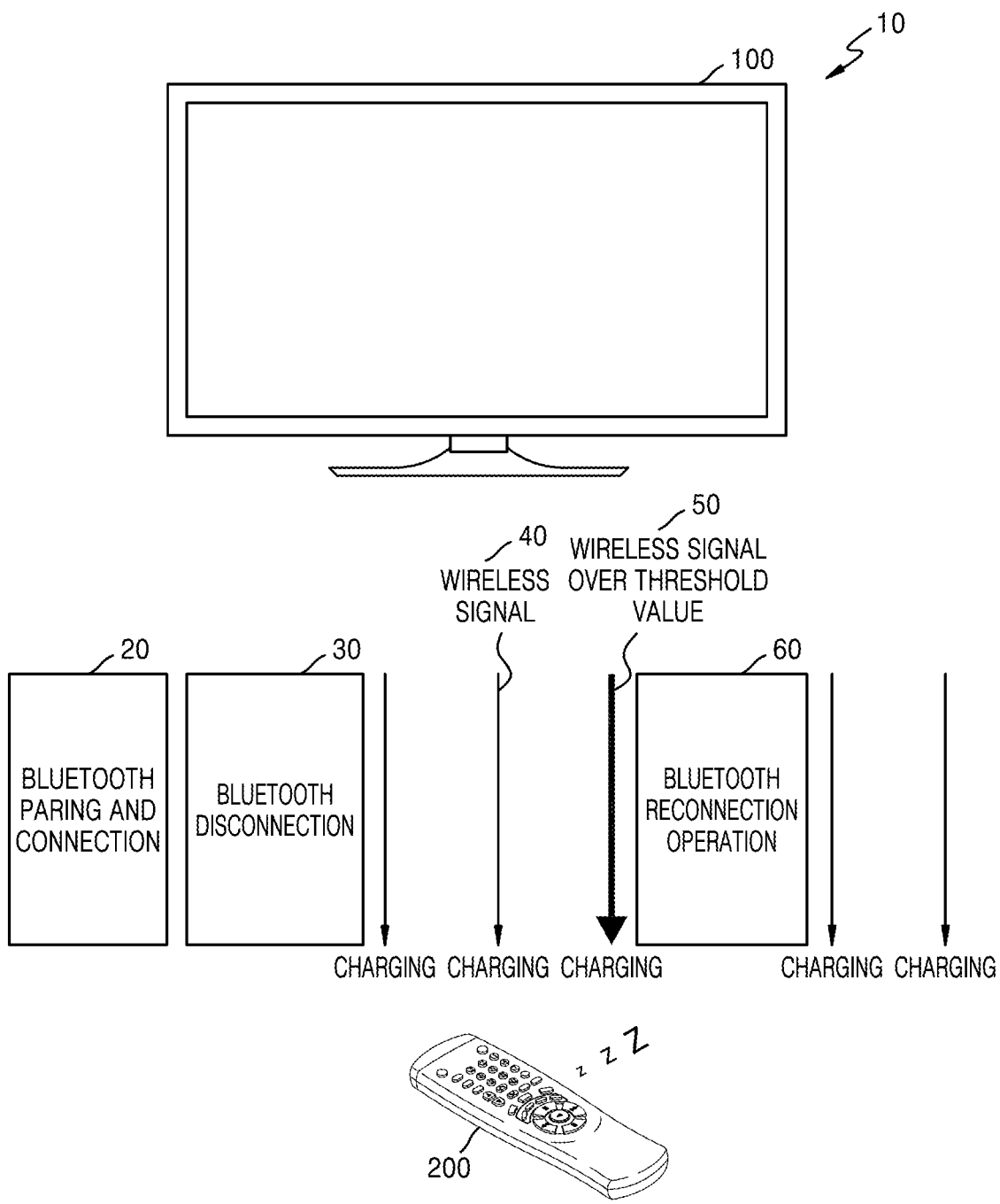
FIG. 1 is a reference diagram for describing operations of a display apparatus and an electronic apparatus that perform Bluetooth communication, according to an example embodiment.

Throughout the disclosure, the expression "at least one of a, b or c" indicates only a, only b, only c, both a and b, both a and c, both b and c, all of a, b, and c, or variations thereof.

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms may be disclosed in a corresponding description part of the present disclosure. Therefore, the terms used in the disclosure should be defined not by the simple names of the terms but by the meaning of the terms and the contents throughout the disclosure.

Throughout the entirety of the specification of the present disclosure, when it is assumed that a certain part includes a certain component, the term 'including' means that a corresponding component may further include other components unless specially described to the contrary. The term used herein such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the embodiments of the disclosure. However, the disclosure may be implemented in various different forms, and are not limited to the embodiments of the disclosure described herein. To clearly describe the disclosure, parts that are not associated with the description have been omitted from the drawings, and throughout the specification, identical reference numerals refer to identical parts.

In an embodiment of the present specification, the term "user" means a person who controls a function or an operation of a computing device or an electronic device by using a control device, and may include a viewer, a manager, or an installation engineer.

A wireless communication network, which is a communication network using Wi-Fi that is an abbreviation of Wireless Fidelity (a wireless data transmission system), enables devices to perform wireless broadband Internet connection by using a local area network (LAN) without a dedicated line or a phone line. Wi-Fi communication is basically communication between an access point (AP) that delivers a wireless signal and a terminal through which a user receives a service. Wi-Fi communication uses a 2.4 GHz/5 GHz frequency band.

FIG. 1 is a reference diagram for describing operations of a display apparatus and an electronic apparatus that perform Bluetooth communication, according to an example embodiment an example embodiment.

Referring to FIG. 1, a system 10 may include an electronic apparatus 100 and a control device 200. Terms, the electronic apparatus 100 and the control device 200 shown in FIG. 1 are used to distinguish entities included in the system 10, and basically mean a computing device that includes a processor and a memory for processing data to perform a function and includes a communication interface (including interface circuitry) to perform communication with another device.

The electronic apparatus 100 may be a television (TV), but may be implemented as a device including a memory and a processor, without being limited thereto. For example, the electronic apparatus 100 may be implemented with various electronic devices such as a cellular phone, a tablet PC, a digital camera, a camcorder, a laptop computer, a tablet PC, a desktop, an electronic(e)-book terminal, a digital broadcasting terminal, a personal digital assistant (PDA), a portable multimedia player (PMP), a navigator, an MP3 player, a wearable device, and so forth. In addition, the electronic apparatus 100 may be of a stationary type or a mobile type, and may be a digital broadcasting receiver capable of receiving digital broadcasting.

The control device 200 may function as a remote-control device of the electronic apparatus 100 to control the electronic apparatus 100, and the control device 200 may be implemented as various forms of devices for controlling the electronic apparatus 100, like a remote controller or a cellular phone. The control device 200 may control the electronic apparatus 100 by using short-range communication including infrared communication or Bluetooth. The control device 200 may control a function of the electronic apparatus 100 by using at least one of a key, a touch pad, a microphone capable of receiving a user's voice, or a sensor (not shown) capable of recognizing a motion of the electronic apparatus 100, which is provided therein. The user may input a string using a keyboard displayed on the display of user input or control device 200 corresponding to the selection of an electronic apparatus 100 in the electronic apparatus 100 using a button and the like provided in the control device 200.

The control device 200 may be various types of information processing devices or personal portable devices. For example, the control device 200 may include a remote controller, a smartphone, a tablet PC, a desktop PC, a laptop PC, a wearable computing device, and the like.

The electronic apparatus 100 and the control device 200 may use Bluetooth communication for mutual communication. In particular, using a Bluetooth low energy (BLE) communication technology, a connection state with low power may be maintained, which may be effective for communication between electronic apparatus 100 and the control device 200 that need to wait in a state of maintaining connection at all times to receive a user's command. However, in order to wait in the state of maintaining the connection between the electronic apparatus 100 and the control device 200, data transmission/reception need to be periodically performed, such that to further reduce power consumption, it may be desirable to release the state of maintaining the connection between the electronic apparatus 100 and the control device 200 and attempt reconnection when communication is required.

According to an example embodiment an example embodiment, the electronic apparatus 100 and the control device 200 may perform pairing and connecting operations for Bluetooth communication in operation 20. Pairing may be an operation for performing authentication and configuring communication connection by exchanging information between the electronic apparatus 100 and the control device 200. After pairing, the electronic apparatus 100 and the control device 200 may maintain a Bluetooth connection state while periodically exchanging data. When substantial communication is required between the electronic apparatus 100 and the control device 200, communication may be performed by exchanging valid data transmission/reception between the electronic apparatus 100 and the control device 200. When substantial communication is not required, the connection state may be maintained by periodically exchanging null data between the electronic apparatus 100 and the control device 200. Power consumption is required for transmission/reception of formal data to maintain the connection state, such that it may be favorable to disconnect the electronic apparatus 100 and the control device 200 from each other.

In the case of pairing between the electronic apparatus 100 and the control device 200 according to an example embodiment, the electronic apparatus 100 may identify the control device 200 by exchanging identification information with the control device 200. The electronic apparatus 100 may determine to transmit a wireless signal for wireless harvesting charging of the control device 200 when the control device 200 is recognized as a specific counterpart as a result of identification performed by the control device 200.

According to an example embodiment, the electronic apparatus 100 and the control device 200 may release Bluetooth connection when the valid data transmission/reception are not required in operation 30.

According to an example embodiment, when the electronic apparatus 100 recognizes the control device 200 as a specific counterpart as a result of pairing with the control device 200, the electronic apparatus 100 may periodically transmit a wireless signal 40 of a specific intensity, and the control device 200 may collect the transmitted wireless signal to store the wireless signal as power of the control device 200, thereby performing a wireless harvesting function. The wireless signal transmitted for use by the electronic apparatus 100 in the wireless harvesting function of the control device 200 may include a variety of wireless signals. For example, the wireless signal may include a Wi-Fi signal or a Bluetooth signal.

Upon release of Bluetooth communication connection, the control device 200 may enter the idle state or the sleep state, and when the control device 200 receives an input from the user, the control device 200 may wake up to attempt Bluetooth communication reconnection to the electronic apparatus 100, thus connecting Bluetooth communication with the electronic apparatus 100.

As the control device 200 enters the idle state or the sleep state upon Bluetooth communication disconnection, the electronic apparatus 100 needs to wake up the control device 200 when the electronic apparatus 100 requires Bluetooth communication connection to the control device 200. To this end, according to an example embodiment, the electronic apparatus 100 may wake up the control device 200 by transmitting a strong wireless signal 50 of a strength over a threshold value instead of a wireless signal of a specific strength for wireless harvesting charging of the control device 200.

According to an example embodiment, for Bluetooth communication reconnection, the electronic apparatus 100 may transmit a wireless signal stronger than a wireless signal of a specific intensity for wireless harvesting charging. According to an example embodiment, the wireless signal stronger than the wireless signal of the specific intensity may include a WiFi signal or a Bluetooth signal. According to an example embodiment, the wireless signal stronger than the wireless signal of the specific intensity may be implemented using a strength or a transmission interval of the wireless signal. That is, the wireless signal of the specific intensity may be referred to as a first signal, and the wireless signal stronger than the wireless signal of the specific intensity may be referred to as a second signal. According to an example, the second signal may be a signal with a wireless signal of a strength higher than the first signal. Alternatively, according to an example, the strength of the second signal is the same as that of the first signal, but the second signal may become a stronger signal than the first signal by narrowing a transmission interval of wireless signals included in the second signal.

According to an example embodiment, the control device 200 having received the wireless signal stronger than the wireless signal of the specific intensity as such may detect that power based on the strong wireless signal is over the threshold value. When the power generated based on the collected wireless signal is over the threshold value, the control device 200 may determine that Bluetooth reconnection is requested from the electronic apparatus 100 and attempt Bluetooth reconnection to the electronic apparatus 100 in operation 60. When the control device 200 attempts Bluetooth reconnection to the electronic apparatus 100 and then exchanges valid data with the electronic apparatus 100, the control device 200 may maintain Bluetooth communication connection. When the control device 200 attempts Bluetooth reconnection to the electronic apparatus 100 and then does not exchange valid data with the electronic apparatus 100, the control device 200 may release Bluetooth connection. This is because when the control device 200 instantly receives a strong wireless signal, the wireless signal may be a signal intentionally transmitted by the electronic apparatus 100 for Bluetooth reconnection, but an unintentionally strong wireless signal may also be collected by the electronic apparatus 100 for other causes, etc.

According to an example embodiment, when the control device 200 performs Bluetooth reconnection to the electronic apparatus 100, the control device 200 and the electronic apparatus 100 may have exchanged information for performing encrypted connection with each other in a pairing operation and have stored the information, and thus may rapidly enter a connection state because of no need to exchange such information again in Bluetooth reconnection.

As such, according to embodiments disclosed in the disclosure, the control device 200 may efficiently supply power of the control device 200 by implementing the wireless harvesting function using the wireless signal of the specific strength transmitted by the electronic apparatus 100. In addition, the electronic apparatus 100 and the control device 200 may be disconnected in the absence of data transmission/reception after Bluetooth communication connection between the electronic apparatus 100 and the control device 200, thereby further saving power consumption of the control device 200. Moreover, when the electronic apparatus 100 intends Bluetooth communication connection to the control device 200, the electronic apparatus 100 may transmit a wireless signal over a threshold value rather than the wireless signal of the specific strength, and when the control device 200 collects power corresponding to the wireless signal over the threshold value, this may be regarded as a Bluetooth communication reconnection event to attempt Bluetooth reconnection to the electronic apparatus 100. As such, by waking up the control device 200 for Bluetooth communication reconnection through transmission and detection of the wireless signal over the threshold value, the control device 200 may easily wake up from the sleep state.

Each embodiment herein may be used in combination with any other embodiment herein.

Figure 2:
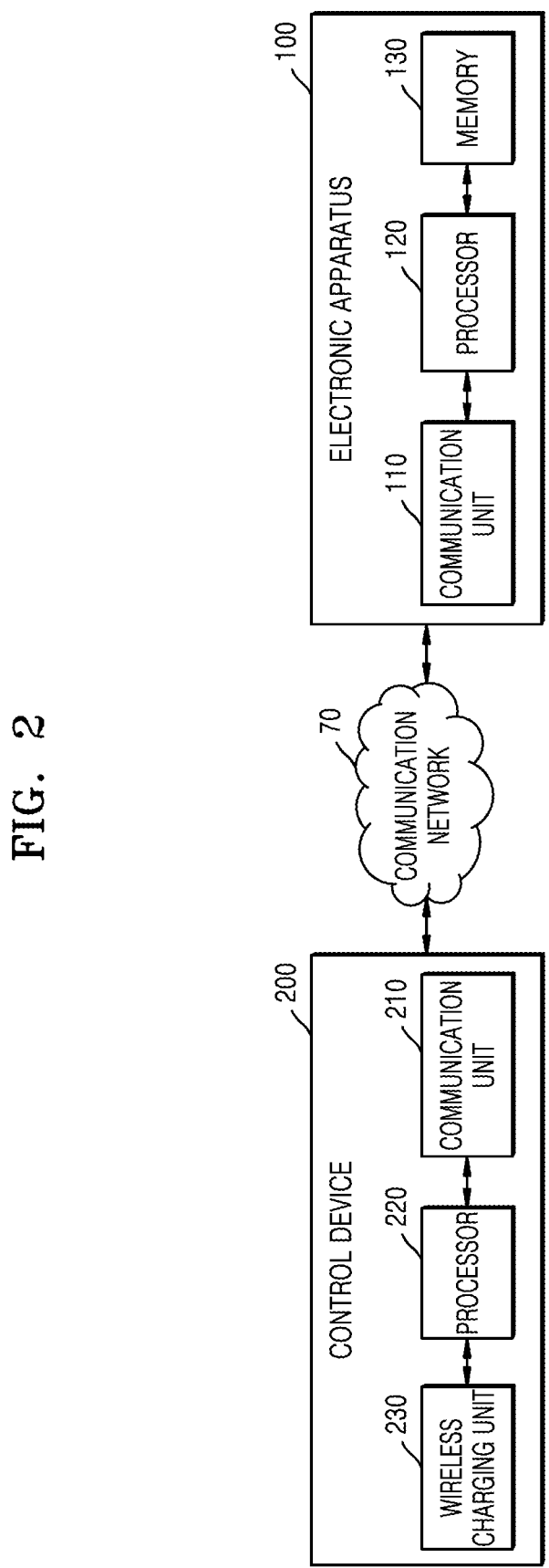
FIG. 2 is a schematic block diagram of an electronic apparatus and an external device, according to an example embodiment.

FIG. 2 is a schematic block diagram of an electronic apparatus and an external device, according to an example embodiment.

Referring to FIG. 2, a system may include the electronic apparatus 100, the control device 200, and a communication network 70 for connecting the electronic apparatus 100 with the control device 200.

The communication network 70, which is a communication network enabling communication between the electronic apparatus 100 and the control device 200 in a short range, may use, for example, Bluetooth, BLE, soft AP, near field communication (NFC), WiFi Direct, etc.

The electronic apparatus 100 and the control device 200 may perform mutual communication connection through the communication network 70.

The electronic apparatus 100 may include a communication unit 110, a processor 120, and a memory 130. However, the electronic apparatus 100 may be implemented by more elements than shown elements, and is not limited to the above-described example.

According to an example embodiment, the communication unit 110 of the electronic apparatus 100 may communicate with the control device 200 via the communication network 70. For example, the communication unit 110 may include a Bluetooth communication module and may further include a WiFi communication module.

The memory 130 according to an example embodiment may store programs for processing and control by the processor 120 and store data input to or output from the electronic apparatus 100.

The memory 130 may include a storage medium of at least one type of a flash memory type, a hard disk type, a multimedia card micro type, a card type memory (e.g., a secure digital (SD) or extreme digital (XD) memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disk, or an optical disk.

The processor 120 may control an overall operation of the electronic apparatus 100. For example, the processor 120 may perform a function of the electronic apparatus 100 disclosed in the disclosure, by executing one or more instructions stored in the memory 130.

In an example embodiment, the processor 120 may control the above-described operations to be performed, by executing one or more instructions stored in the memory 130. In this case, the memory 130 may store one or more instructions executable by the processor 120.

In addition, in an example embodiment, the processor 120 may store one or more instructions in an internally provided memory, and may control the above-described operations to be performed by executing the one or more instructions stored in the internally provided memory. That is, the processor 120 may perform an operation by executing at least one instruction or program stored in an internal memory included in the processor 120 or the memory 130.

Moreover, FIG. 2 shows one processor 120, but a plurality of processors may be provided. In this case, each of operations performed in a display apparatus according to an example embodiment may be performed by at least one of the plurality of processors.

According to an example embodiment, the processor 120 may perform Bluetooth communication connection with the control device, by executing one or more instructions stored in the memory 130.

According to an example embodiment, the processor 120 may, by executing one or more instructions stored in the memory 130, identify the control device communication-connected through Bluetooth communication connection with the control device and transmit a wireless signal of a first intensity for power charging of the control device as the communication-connected control device is identified as a specific control device as an identification result.

According to an example embodiment, the processor 120 may, by executing the one or more instructions stored in the memory 130, change a wireless signal to be transmitted to the control device from the wireless signal of the first intensity into a wireless signal of a second intensity that is higher than the first intensity and transmit the wireless signal to the control device, based on a predetermined/predesignated event. A predetermined/predesignated event may include, for example, a request for Bluetooth reconnection with the control device, etc.

According to an example embodiment, the processor 120 may, by executing one or more instructions stored in the memory 130, receive a request for communication reconnection from the control device according to transmission of the wireless signal of the second intensity and respond to the request for communication reconnection, thus performing communication connection with the control device.

According to an example embodiment, the wireless signal of the first intensity and the wireless signal of the second intensity may be wireless signals corresponding to different communication protocols. For example, the wireless signal of the first intensity may include a Bluetooth signal of the first intensity, and the wireless signal of the second intensity may include a WiFi signal of the second intensity.

According to an example embodiment, the wireless signal of the first intensity and the wireless signal of the second intensity are wireless signals corresponding to the same communication protocol, and may have different intensities. For example, the first intensity and the second intensity of the wireless signals may be determined by at least one of a strength or a transmission time interval of the wireless signals. Such a wireless signal may include a WiFi signal.

The electronic apparatus 100 may be an apparatus of any type performing a function by including a processor and a processor. The electronic apparatus 100 may be an apparatus of a stationary type or a portable type. For example, the electronic apparatus 100 may include various electronic apparatuses such as a computer such as a desktop, a laptop, and a tablet, a TV, a set-top box, a smart phone, a cellular phone, a game player, a music player, a video player, medical equipment, a home appliance, etc. The electronic apparatus 100 may be referred to as a multimedia device, a computing device, and a media device.

The control device 200 will be described below.

The control device 200 may include a communication unit 210, a processor 220, and a wireless charging unit 230. However, the control device 200 may be implemented by more elements than shown elements, and is not limited to the above-described example.

According to an example embodiment, the communication unit 210 may perform communication with the electronic apparatus 100 through the communication network 70. For example, the communication unit 210 (including communication circuitry) may include a Bluetooth communication module and may further include a WiFi communication module.

The wireless charging unit 230 may collect a wireless signal received through an antenna of the control device 200 to store power, thereby performing the wireless harvesting function.

The processor 220 may control an overall operation of the control device 200. For example, the processor 220 may perform a function of the control device 200 described in the disclosure, by executing one or more instructions stored in the memory.

In an example embodiment, the processor 220 may control the above-described operations to be performed, by executing one or more instructions stored in the memory.

In addition, in an example embodiment, the processor 220 (including processing circuitry) may store one or more instructions in an internally provided memory, and may control the above-described operations to be performed by executing the one or more instructions stored in the internally provided memory. That is, the processor 220 may perform an operation by executing at least one instruction or program stored in an internal memory included in the processor 220 or an external memory.

Moreover, FIG. 2 shows one processor 220, but a plurality of processors may be provided. In this case, each of operations performed in an external device according to an example embodiment may be performed by at least one of the plurality of processors.

According to an example embodiment, the processor 220 may, by executing one or more instructions stored in the memory, perform Bluetooth communication connection with the electronic apparatus 100 and upon receiving a wireless signal of the first intensity for power charging from the communication-connected electronic apparatus, control the wireless charging unit 230 to collect the wireless signal of the first intensity and charge power.

According to an example embodiment, the processor 220 may, by executing one or more instructions stored in the memory, release Bluetooth connection of the electronic apparatus 100 in the absence of valid data transmission/reception with the electronic apparatus 100 after performing Bluetooth communication connection with the electronic apparatus 100, thereby preventing power consumption of the control device 200.

According to an example embodiment, the processor 220 may, by executing one or more instructions stored in the memory, detect that the intensity of power charged by the wireless charging unit 230 exceeds a threshold value, transmit a request for communication reconnection to the electronic apparatus 100 upon detection of the power of the intensity over the threshold value, and receive a response to the request for communication reconnection from the electronic apparatus 100, thereby performing communication connection with the electronic apparatus 100.

According to an example embodiment, the processor 220 may, by executing one or more instructions stored in the memory, detect that the intensity of the power charged by the wireless charging unit 230 exceeds the threshold value, upon receiving the wireless signal of the second intensity that is different from the wireless signal of the first intensity from the electronic apparatus 100.

According to an example embodiment, the wireless signal of the first intensity and the wireless signal of the second intensity may be wireless signals corresponding to different communication protocols. For example, the wireless signal of the first intensity may include a Bluetooth signal of the first intensity, and the wireless signal of the second intensity may include a WiFi signal of the second intensity.

According to an example embodiment, the wireless signal of the first intensity and the wireless signal of the second intensity are wireless signals corresponding to the same communication protocol, and may have different intensities. The first intensity and the second intensity of the wireless signals may be determined by at least one of a strength or a transmission time interval of the wireless signals. The wireless signal may include a WiFi signal.

Figure 3:
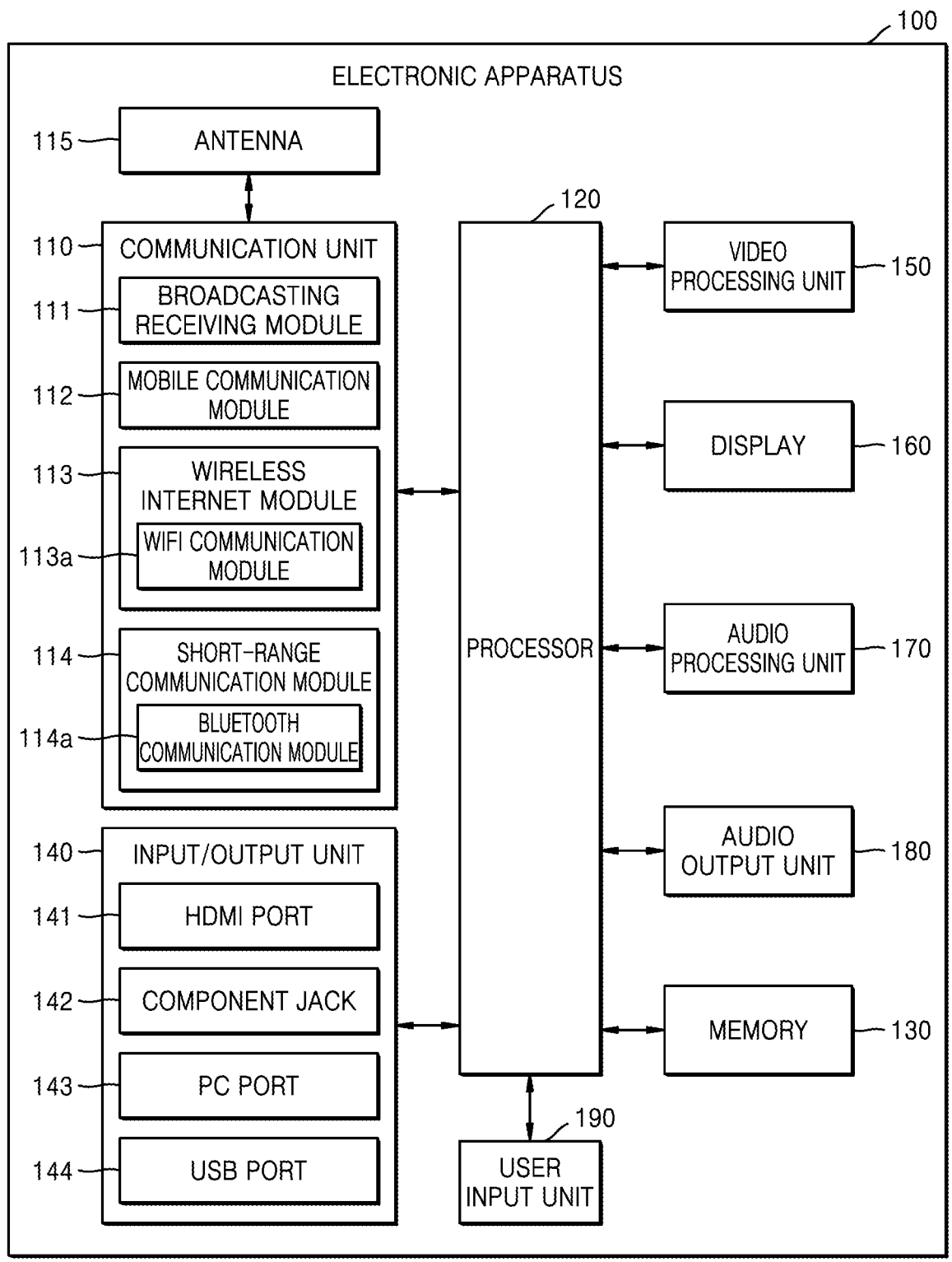
FIG. 3 is a detailed block diagram of an electronic apparatus and an external device, according to an example embodiment.

FIG. 3 is a detailed block diagram of an electronic apparatus and an external device, according to an example embodiment.

In FIG. 3, the same component as in FIG. 2 is shown using the same reference symbol. Thus, to describe the electronic apparatus 100, a description redundant in FIG. 2 will be omitted.

Referring to FIG. 3, the electronic apparatus 100 may further include an antenna 115, an input/output unit 140, a video processing unit 150, a display 160, an audio processing unit 170, an audio output unit 180, and a user input unit 190, in addition to the communication unit 110, the processor 120, and the memory 130. The processor 120 may control each component of the electronic apparatus 100 to perform a corresponding operation.

For the processor 120 and the memory 130, the same description as in FIG. 2 will be omitted in FIG. 3.

The antenna 115 may receive a signal transmitted from other devices or transmit a signal to the other devices. Although one antenna 115 is shown, a plurality of antennas may be provided to support a multiple input multiple output (MIMO) system.

The communication unit 110 may include one or more modules that enable wireless communication between the electronic apparatus 100 and a wireless communication system or between the electronic apparatus 100 and a network where another electronic apparatus is located. For example, the communication unit 110 may include a broadcasting receiving module 111, a mobile communication module 112, a wireless Internet module 113, and a short-range communication module 114. The communication unit 110 may be referred to as a transmission/reception unit.

The broadcasting receiving module 111 may receive a broadcasting signal and/or broadcasting-related information from an external broadcasting management server through a broadcasting channel. A broadcasting signal may include not only a TV broadcasting signal, a radio broadcasting signal, and a data broadcasting signal, but also a broadcasting signal in a form where the data broadcasting signal is combined with the TV broadcasting signal or the radio broadcasting signal.

The mobile communication module 112 may transmit and receive a wireless signal to and from at least one of a base station, an external terminal, or a server on a mobile communication network. The wireless signal may a voice call signal, a video communication call signal, or various forms of data corresponding to transmission/reception of a text/multimedia message.

The wireless Internet module 113 refers to a module for wireless Internet connection, and may be included in or external to a device. As a wireless Internet technique, a wireless LAN (WLAN), wireless broadband (Wibro), world interoperability for microwave access (Wimax), high speed downlink packet access (HSDPA), etc., may be used. Through the wireless Internet module 113, the electronic apparatus 100 may perform WiFi peer-to-peer (P2P) connection with another device.

According to an example embodiment, the wireless Internet module 113 may include a WiFi communication module 113*a*. According to an example embodiment, the WiFi communication module 113*a* may transmit a wireless signal of a specific intensity for wireless harvesting charging of the control device 200 that is Bluetooth-communication paired, under control by a controller 120. According to an example embodiment, the WiFi communication module 113*a* may transmit a wireless signal stronger than the wireless signal of the specific intensity to wake up the Bluetooth-communication-paired control device 200 in the sleep state, under control by the controller 120. Each "module" herein may include circuitry.

The short-range communication module 114 may refer to a module for short-range communication. As a short-range communication technique, Bluetooth, radio frequency identification (RFID), infrared data association (IrDA), ultra wideband (UWB), ZigBee, etc., may be used.

According to an example embodiment, the short-range communication module 114 may include a Bluetooth communication module 114a. According to an example embodiment, the Bluetooth communication 114a may perform Bluetooth communication connection including Bluetooth pairing with the control device 200, under control by the processor/controller 120. According to an example embodiment, the Bluetooth communication module 114a may transmit a wireless signal of a specific intensity for wireless harvesting charging of the Bluetooth-communication-paired control device 200, under control by the processor/controller 120.

The inputter/outputter 140 may receive video (e.g., moving images, etc.), audio (e.g., a voice, music, etc.), and additional information (e.g., an electronic program guide (EPG), etc.) from the outside of the electronic apparatus 100, under control by the processor 120. The input/output unit 140 may include one of a high-definition multimedia interface (HDMI) port 141, a component jack 142, a PC port 143, or a universal serial bus (USB) port 144. The input/output unit 140 may include a combination of the HDMI port 141, the component jack 142, the PC port 143, and the USB port 144.

The video processing unit 150 may process image data to be displayed by the display 160 and perform various image processing, such as decoding, rendering, scaling, noise reduction, frame rate conversion, resolution conversion, etc., with respect to the image data.

The display 160 may display an image on a screen, under control by the processor 120. The image displayed on the screen may be received from the communication unit 110, the input/output unit 140, and the memory 130.

The audio processing unit 170 may process audio data. The audio processing unit 170 may perform various processing such as decoding, amplification, noise reduction, etc., on the audio data.

The audio output unit 180 may output audio included in a broadcast signal received under control by the processor 120, audio input through the communication unit 110 or the input/output unit 140, and audio stored in the memory 130. The audio output unit 180 may include at least one of a speaker, a headphone output terminal, or a Sony/Phillips digital interface (S/PDIF) output terminal.

The user input unit 190 may be a means through which the user inputs data for controlling the electronic apparatus 100. For example, the user input unit 190 may include, but not limited to, a key pad, a dome switch, a touch pad, a jog wheel, a jog switch, and so forth.

The memory 130 according to an example embodiment may store programs for processing and control by the processor 120 and store data input to or output from the electronic apparatus 100. In addition, the memory 130 may store data necessary for an operation of the electronic apparatus 100.

The programs stored in the memory 130 may be classified into a plurality of modules according to functions thereof.

According to an example embodiment, the memory 130 may store one or more instructions for performing an operation of the electronic apparatus 100 disclosed in the disclosure.

The processor 120 may control an overall operation of the electronic apparatus 100 and a signal flow among internal components of the electronic apparatus 100, and process data. The processor 120 may execute an operating system (OS) and various applications stored in the memory 130, when there is a user input or a preset and stored condition is satisfied.

The processor 120 may also include an internal memory. In this case, at least one of data, programs, or instructions stored in the memory 130 may be stored in an internal memory (not shown) of the processor 120.

Meanwhile, the block diagram of the electronic apparatus 100 shown in FIG. 2 or 3 may be a block diagram for an example embodiment. Each component of the block diagram may be integrated, added, or omitted depending on the specifications of the electronic apparatus 100 implemented actually. For example, when necessary, two or more components may be integrated into one component or one component may be divided into two or more components. In addition, a function executed in each block may be intended to describe embodiments of the disclosure, and a detailed operation or apparatus thereof does not limit the scope of the disclosure.

Figure 4:
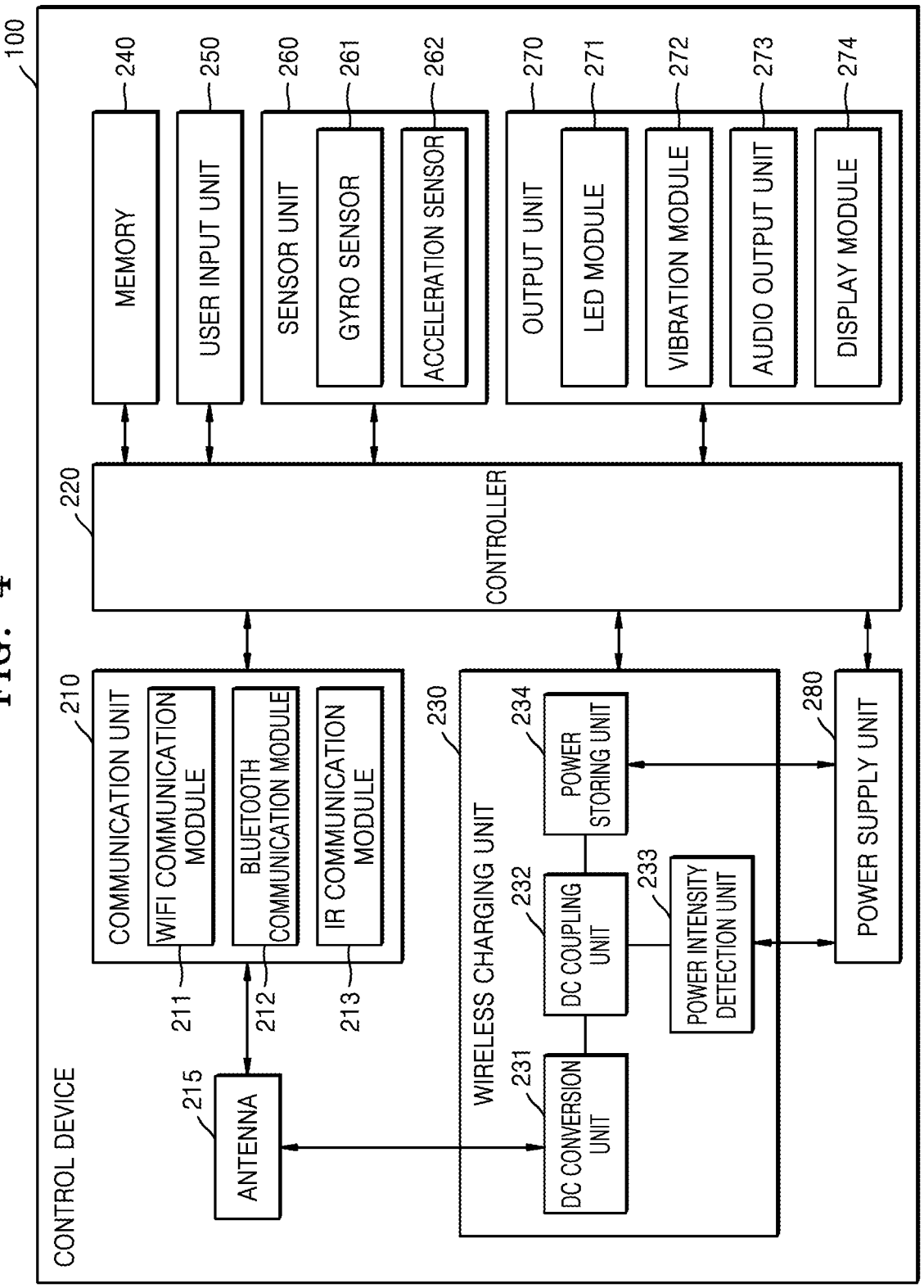
FIG. 4 is a detailed block diagram of a control device according to an example embodiment.

FIG. 4 is a detailed block diagram of a control device according to an example embodiment.

In FIG. 4, the same component as in FIG. 2 is illustrated using the same reference symbol. Thus, when the control device 200 is described, a description redundant to that made with reference to FIG. 2 will be omitted.

Referring to FIG. 4, the control device 200 may further include a memory 240, a user input unit 250, a sensor unit 260, and an output unit 270 in addition to the communication unit 210, the processor/controller 220 (including processing circuitry), and the wireless charging unit 230.

The processor 220 may control each component of the control device 200 to perform an operation. Each "processor" herein includes processing circuitry.

The communication unit 210 may include one or more modules that enable wireless communication between the control device 200 and a wireless communication system or between the control device 200 and a network where another electronic apparatus is located. For example, the communication unit 210 may include a WiFi communication module 211, a Bluetooth communication module 212, an infrared (IR) communication module 213, etc.

An antenna 215 may receive a signal transmitted from other devices or transmit a signal to the other devices. Although one antenna 215 is shown, a plurality of antennas may be provided to support a MIMO system.

The wireless charging unit 230 (including circuitry and/or at least one coil) may include a direct current (DC) conversion unit 231, a DC coupling unit 232, a wireless signal intensity detection unit 233, and a power storing unit 234.

The wireless charging unit 230 may collect a wireless signal received through the antenna 215 to store power. Even in an idle mode of the control device 200, that is, a state where power is not supplied to other components of the control device 200, power may be supplied to the wireless charging unit 230, thereby performing the wireless harvesting function.

The antenna 215 for transmitting a wireless signal to the wireless charging unit 230 may collect a frequency signal of a frequency band allocated to the antenna 215 to transmit the collected frequency signal to the DC conversion unit 231. A frequency band allocated to the antenna 215 may be allocated for each Wi-Fi channel, and the antenna 215 may collect the wireless signal of the allocated Wi-Fi channel and transmit the wireless signal to the DC conversion unit 231. The WiFi wireless signal may be transmitted and received through 13 channels in a 2.4 GHz frequency region and through 28 channels in a 5 GHz frequency region. Thus, according to an example embodiment, it is possible to increase energy efficiency while improving the total amount of collected wireless signal energy collected, by using a plurality of antennas that respectively collect a wireless signal for each channel.

The DC conversion unit 231 may receive a wireless signal collected in the antenna 215. When the DC conversion unit 231 receives a wireless signal for each channel from a plurality of antennas, the DC conversion unit 231 may include one or more DC conversion modules corresponding to each antenna. The DC conversion unit 231 having received a frequency signal from an antenna may convert a received frequency signal into a DC voltage and deliver the converted DC voltage to the DC coupling unit 232.

The DC coupling unit 232 may couple the DC voltage converted in one or more DC conversion units 231 to one DC voltage, and store power generated based on the DC voltage coupled in this way in the power storing unit 234.

The power intensity detection unit 233 may detect the intensity of power generated based on the DC voltage coupled by the DC coupling unit 232. More specifically, when the power intensity detection unit 233 monitors the strength of the power generated by the DC coupling unit 232 and detects that the monitored intensity of the power exceeds a threshold value, then the power intensity detection unit 233 may transmit a signal indicating that the intensity of the power exceeds the threshold value to a power supply unit 280. For example, the power intensity detection unit 233 may detect, as a result of monitoring the intensity of the collected power, usually, that the intensity of the collected power is a first strength, whereas the intensity of the power at any time point is a second strength exceeding the threshold value. At this time, the power intensity detection unit 233 may transmit a signal indicating that the intensity of the power is the second strength exceeding the threshold value to the power supply unit 280. As such, when the power intensity detection unit 233 detects that the intensity of the monitored power is the second strength exceeding the threshold value, the power intensity detection unit 233 may transmit such a detection result to the power supply unit 280 to control the power supply unit 280 to supply power to each component of the control device 200 in the idle mode.

In the idle mode of the control device 200, some of components of the control device 200 are in a state where power supply is stopped, such that when the power intensity detection unit 233 detects that the monitored intensity of the power is the second strength exceeding the threshold value, the power intensity detection unit 233 transmits the detection result to the power supply unit 280 to control the control device 200 to wake up from the idle mode. A control signal transmitted from the power intensity detection unit 233 to the power supply unit 280 may include a command instructing Bluetooth communication reconnection because power exceeding a threshold value is detected, and the power supply unit 280 may transmit the command to the controller 220.

While it is shown in an example of FIG. 4 that the control signal is transmitted to the power supply unit 280 by the power intensity detection unit 233 and the power supply unit 280 transmits the command to the controller 220 accordingly, the disclosure is not limited to this example. Thus, the disclosure may also be implemented by various components capable of detecting a wireless signal distinct from a wireless signal used for wireless charging and waking up the control device 200 from the idle mode or a sleep mode by the detected wireless signal to switch the control device 200 to a state where an operation for communication may be performed.

Alternatively, according to another embodiment of the disclosure, instead of detecting a wireless signal distinct from a wireless signal used for wireless charging and waking up the control device 200 from the idle mode or the sleep mode by the detected wireless signal to switch the control device 200 to a normal mode, the Bluetooth communication module 212 capable of performing a Bluetooth communication operation may be caused to operate to attempt the Bluetooth communication operation with the electronic apparatus 100.

The user input unit 250 may include one or more means for receiving a user input.

In the normal mode of the control device 200, the user input unit 250 may transmit the command corresponding to the user input to the controller 220.

According to an example embodiment, in the idle mode or the sleep state of the control device 200, the user input unit 250 may transmit the command corresponding to the user input to the power supply unit 280 to control the power supply unit 280 to supply power to each component of the control device 200.

The user input unit 250 may include a keypad, buttons, a touch pad, a touch screen, or the like. The user may input a command related to the electronic apparatus 100 to the control device 200 by manipulating the user input unit 250. When the user input unit 250 includes a hard key button, the user may input a command related to the electronic apparatus 100 to the control device 200 by pushing the hard key button. When the user input unit 250 includes a touch screen, the user may input a command related to the electronic apparatus 100 to the control device 200 by touching a soft key of a touch screen.

For example, the user input unit 250 may include a 4-direction button or a 4-direction key. The 4-direction button or the 4-direction key may be used to control a window, a region, an application, or an item displayed on the screen of the electronic apparatus 100. The 4-direction key or button may be used to indicate up, down, left and right movements. Further, it will be understood by those of ordinary skill in the art that the user input unit 250 may include a 2-direction key or a 2-direction button instead of the 4-direction key or the 4-direction button.

Moreover, the user input unit 250 may include various types of input means such as a scroll key, a jog key, etc., the user may manipulate.

The user input unit 250 may also include a touch pad. The user input unit 250 according to an example embodiment may receive a user input such as a drag input, a touch input, or a flip input through the touch pad of the control device 200. Depending on a type of the received user input (e.g., a direction in which a drag command is input, a time at which a touch command is input, etc.), the electronic apparatus 100 may be controlled.

The sensor unit 260 may include a gyro sensor 261 or an acceleration sensor 262. The gyro sensor 261 may sense information regarding movement of the control device 200. For example, the gyro sensor 261 may sense information about an operation of the control device 200 based on x, y, and z axes. The acceleration sensor 262 may sense information about a moving speed of the control device 200.

The control device 200 according to an example embodiment may be implemented as a pointing device including a 4-direction key, a touch pad, a gyro sensor, and an acceleration sensor. That is, when the control device 200 is implemented as a pointing device, the function of the electronic apparatus 100 may be controlled according to a direction or an angle of inclination using the gyro sensor 261 of the control device 200.

The control device 200 according to an example embodiment may be implemented as a pointing device including a 4-direction key, the gyro sensor 261, and the acceleration sensor 262.

The output unit 270 may output an image or voice signal corresponding to manipulation of the user input unit 250 or a signal received by the electronic apparatus 100. The user may recognize manipulation with respect to the user input unit 250 or control by the electronic apparatus 100, through the output unit 270. For example, the output unit 270 may include a light-emitting diode (LED) module 271 that is lighted on when the user input unit 250 is manipulated or a signal is transmitted to or received from the electronic apparatus 100 through the communication unit 210, a vibration module 272 configured to generate vibration, an audio output module 273 configured to output audio, or a display module 274 configured to output an image.

The power supply unit 280 may supply power to each component of the control device 200 using the power stored in the power storing unit 234. The power supply unit 280 may reduce power consumption by stopping power supply when the control device 200 does not move for a certain period of time.

According to an example embodiment, the power supply unit 280 may resume power supply when a specific key included in the control device 200 is manipulated.

According to an example embodiment, the power supply unit 280 may resume power supply when receiving a control signal from the power intensity detection unit 233. For example, when the power intensity detection unit 233 detects that power exceeding a threshold value is collected, the power intensity detection unit 233 may transmit a control signal indicating that the power exceeding the threshold value is collected to the power supply unit 280. When the control signal is received from the power intensity detection unit 233, the power supply unit 280 may resume power supply to each component of the control device 200.

The memory 240 may store various types of programs necessary for control or operations of the control device 200, application data, and so forth.

The controller 220 may control overall matters related to control of the control device 200. The controller 220 may transmit a signal corresponding to manipulation of a specific key of the user input unit 250 or a signal corresponding to movement of the control device 200 sensed by the sensor unit 260 to the electronic apparatus 100 through the communication unit 210.

According to an example embodiment, the controller 220 may control the Bluetooth communication module 212 to Bluetooth-communication-connect to the electronic apparatus 100.

According to an example embodiment, the controller 220 may the Bluetooth communication module 212 to store information for maintaining encrypted connection with the electronic apparatus 100 through pairing and bonding of Bluetooth communication with the electronic apparatus 100.

According to an example embodiment, the controller 220 may control the wireless charging unit 230 to perform wireless harvesting charging by collecting a wireless signal of a specific intensity received from the electronic apparatus 100 after Bluetooth communication connection with the electronic apparatus 100.

According to an example embodiment, the controller 220 may control the Bluetooth communication module 212 to release Bluetooth connection when there is no valid data transmission/reception with the electronic apparatus 100 after the Bluetooth communication connection with the electronic apparatus 100, and may enter the idle mode or the sleep state of the control device 200. In the idle mode or the sleep state of the control device 200, power may be supplied to some components of the control device 200, and power supply may be stopped for the other components such that only minimum power may be consumed. For example, a component to which power supply is maintained in the idle mode or the sleep state of the control device 200 may include the wireless charging unit 230 or the user input unit 250 or the sensor unit 260 for receiving a user input.

According to an example embodiment, the controller 220 may receive a control signal including a command for Bluetooth communication reconnection because the power exceeding the threshold value is detected from the power supply unit 280 in the idle mode of the control device 200. According to an example embodiment, the controller 220 may control the Bluetooth communication module 212 to Bluetooth-communication-reconnect to the electronic apparatus 100.

Meanwhile, the block diagram of the control device 200 shown in FIGS. 2 through 4 is a block diagram for an example embodiment. Components of the block diagram may be integrated, added, or omitted depending on the specifications of the control device 200 implemented actually. For example, when necessary, two or more components may be integrated into one component or one component may be divided into two or more components. A function executed in each block is intended to describe embodiments of the disclosure, and a detailed operation or apparatus thereof does not limit the scope of the disclosure.

Figure 5:
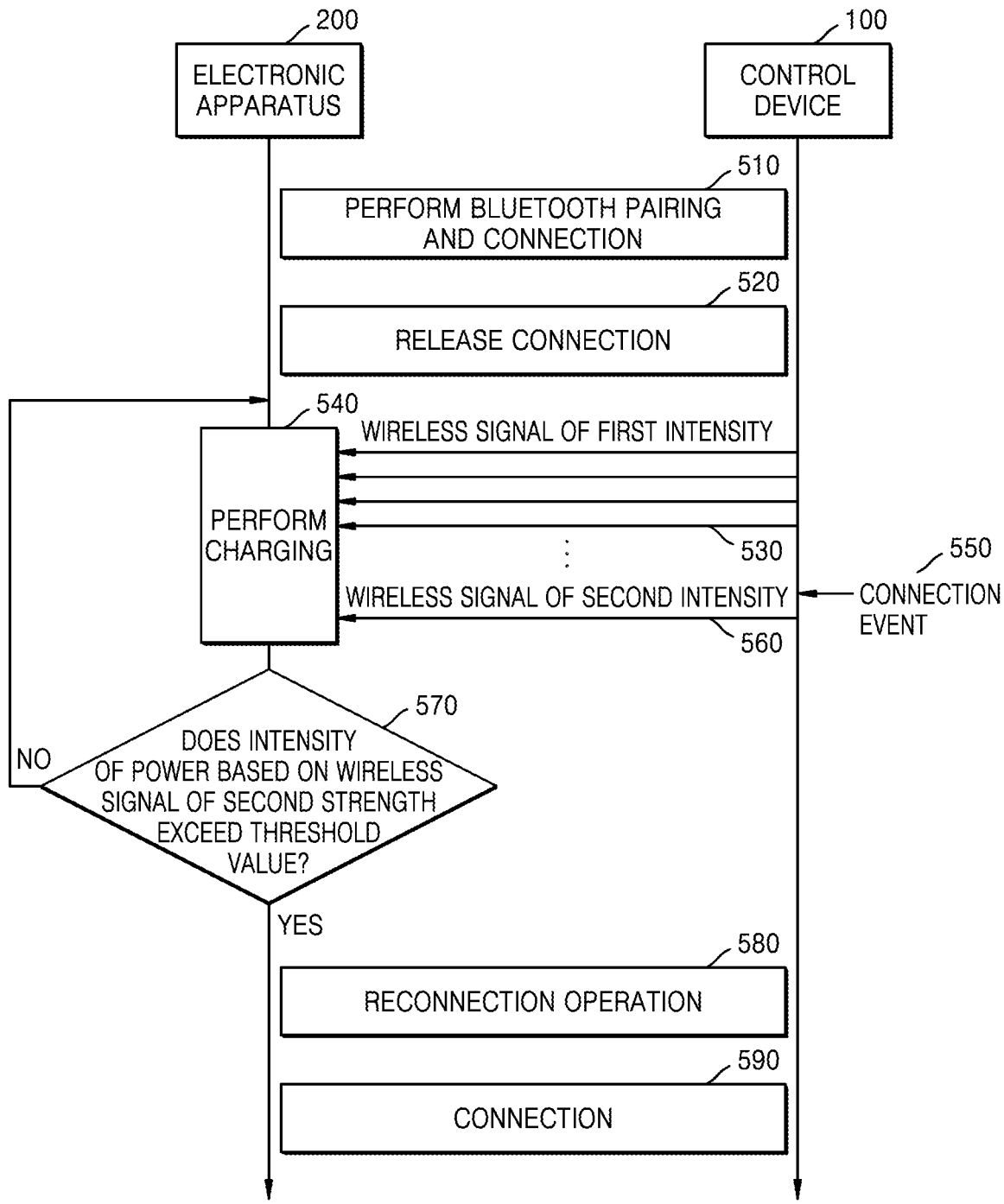
FIG. 5 is an example of a flowchart illustrating operations between an electronic apparatus and a control device, according to an example embodiment.

FIG. 5 is an example of a flowchart illustrating operations between the electronic apparatus 100 and the control device 200, according to an example embodiment.

Referring to FIG. 5, in operation 510, the electronic apparatus 100 and the control device 200 may perform Bluetooth pairing and connection operations. Bluetooth pairing may indicate, between two devices attempting Bluetooth communication, providing their information first, to authenticate each other and define agreement for the Bluetooth communication connection. The electronic apparatus 100 and the control device 200 may maintain a connection state after Bluetooth pairing. An operation in which the electronic apparatus 100 and the control device 200 discover each other and are paired with each other will be described with reference to FIGS. 6 and 7.

In operation 520, the electronic apparatus 100 and/or the control device 200 may release the Bluetooth communication connection. When Bluetooth communication is performed between the electronic apparatus 100 and the control device 200 after Bluetooth pairing and connection in operation 510, the electronic apparatus 100 and the control device 200 may maintain a Bluetooth connection state. However, the electronic apparatus 100 and the control device 200 may be disconnected from each other when formal data transmission/reception for merely maintaining the connection state occurs without a valid data transmission/reception operation. More specifically, the control device 200 may release the connection by not responding to data sent by the electronic apparatus 100. As such, by releasing the connection, the control device 200 may save power required for formal data transmission/reception. As such, by releasing the connection, the control device 200 may enter the idle mode or the sleep state where power is supplied to some components of the control device 200 and power supply to the other components is stopped.

While maintaining the connection between the electronic apparatus 100 and the control device 200, a current consumption is about 14 µA. However, in the case of disconnection, the current consumption may be about 4 µA, and thus the current consumption may be saved by about 70% or more in comparison with the case of maintaining the connection. Needless to say, the current consumption is used through mass data communication in the case of reconnection, but the disconnection is maintained for one hour or more, the current consumption for the disconnection and reconnection becomes smaller than the current consumption maintaining the connection. When a power-off time of the electronic apparatus 100 exceeds 1 hour, disconnection may benefit the current consumption.

In operation 530, the electronic apparatus 100 may transmit a wireless signal of the first intensity after establishing Bluetooth connection with the control device 200. That is, the electronic apparatus 100 may transmit the wireless signal of the first intensity for wireless harvesting charging of the control device 200 when the electronic apparatus 100 recognizes that the control device 200 is a preset counterpart in Bluetooth connection with the control device 200. The wireless signal of the first intensity may include a WiFi wireless signal or a Bluetooth wireless signal as a wireless signal of a specific strength.

In operation 540, the control device 200 may charge power of the control device 200 by collecting the wireless signal of the first intensity and harvesting the power. In addition, the control device 200 may collect the wireless signal through the antenna for charging and monitor the intensity of power according to the collected wireless signal to determine whether the intensity of the collected power exceeds a threshold value.

In operation 550, the electronic apparatus 100 may receive an event requesting connection with the control device 200. The event requesting connection with the control device 200 may include, for example, an input requesting discovery of the control device 200 in the idle mode.

In operation 560, upon reception of the event requesting connection, the electronic apparatus 100 may transmit a wireless signal of the second intensity that is different from the wireless signal of the first intensity transmitted for a typical wireless harvesting purpose to wake up the control device 200 in the idle state. According to an example embodiment, the wireless of the second intensity may be a signal corresponding to the same protocol as the wireless signal of the first intensity. According to an example embodiment, the wireless signal of the second intensity and the wireless signal of the first intensity may be wireless signals corresponding to different communication protocols.

In operation 570, the control device 200 may determine whether the intensity of power based on the wireless signal of the second intensity exceeds a threshold value, as a result of monitoring the intensity of power based on the wireless signal collected from the antenna. As a result of the determination, when the intensity of the power based on the wireless signal of the second intensity does not exceed the threshold value, the control device 200 may proceed with an operation of receiving the next wireless signal without any particular action and performing charging. As a result of the determination, when the intensity of the power based on the wireless signal of the second intensity exceeds the threshold value, the control device 200 may proceed to operation 580 and perform reconnection. When the intensity of the power based on the wireless signal of the second intensity exceeds the threshold value, the control device 200 may recognize that reconnection with the external electronic apparatus 100 is required in addition to conventional wireless signal charging.

In operation 580, the control device 200 may perform a Bluetooth reconnection operation to the electronic apparatus 100. In the Bluetooth reconnection operation, the control device 200 may use information required for encrypted connection with the electronic apparatus 100 stored in the Bluetooth pairing and connection operation of operation 510, thus not needing to exchange the information required for the encrypted connection with the electronic apparatus 100. Thus, the control device 200 may more quickly perform the connection with the electronic apparatus 100 in the Bluetooth reconnection operation.

In operation 590, the control device 200 may maintain the connection state with the electronic apparatus 100 through the Bluetooth reconnection operation.

Hereinbelow, operations between the electronic apparatus 100 and the control device 200 shown in FIG. 5 will be described in more detail.

Figure 6:
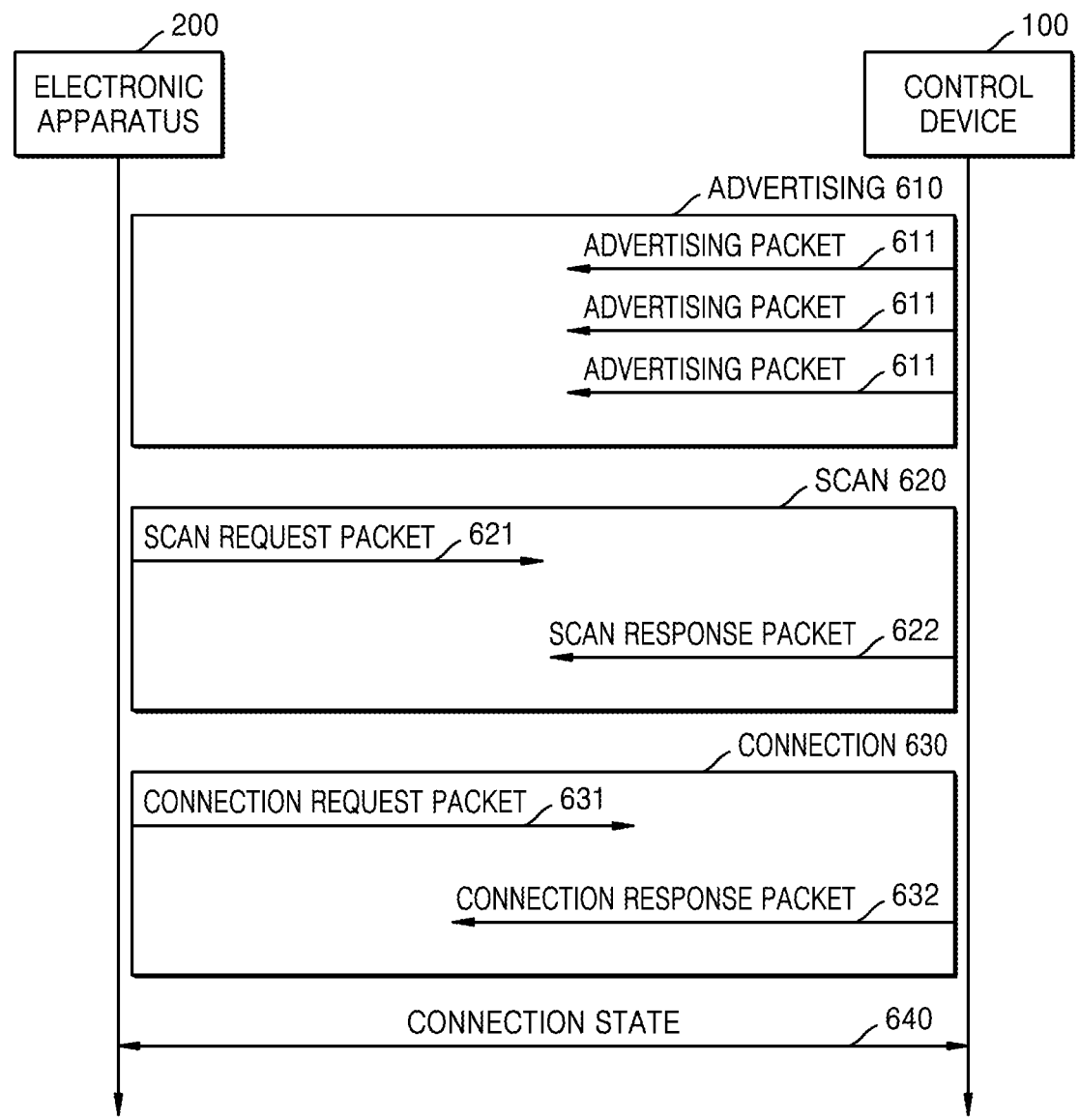
FIG. 6 illustrates a detailed operation to establish a Bluetooth connection between an electronic apparatus and a control device, according to an example embodiment.

FIG. 6 illustrates a detailed operation to establish a Bluetooth connection between the electronic apparatus 100 and the control device 200, according to an example embodiment.

Referring to FIG. 6, in operation 610, when the electronic apparatus 100 transmits an advertising packet 611 without a destination, nearby devices may receive the advertising packet to recognize a nearby device transmitting the advertising packet. The advertising packet may include a 31-byte payload including user-designated data in header data containing device information. The header data may include a 6-byte medium access control (MAC) address, i.e., a Bluetooth address, which is a unique address that identifies a Bluetooth device.

In operation 620, the control device 200 having received the advertising packet 611 may transmit a scan request packet 621 to the electronic apparatus 100. The electronic apparatus 100 having received the scan request packet 621 may transmit a scan response packet 622 to the control device 200 as a response. When there is information that may not be contained in 31 bytes of the advertising packet, 31 bytes may be added to a scan response packet and transmitted. In general, a name of a Bluetooth device may be transmitted through a scan response packet.

In operation 630, the control device 200 may transmit a connection request packet 631 to the electronic apparatus 100, and when the electronic apparatus 100 transmits a connection response packet 632 as a response to the control device 200, connection may be established between the electronic apparatus 100 and the control device 200. The connection request packet 631 may contain information for channel hopping. The connection may indicate transmitting and receiving data according to a defined connection interval between a master (i.e., a control device) and a slave (i.e., an electronic apparatus). Accordingly, when connection is established, the master, i.e., the control device 200, may transmit and share connection parameters related to connection settings. The connection parameter may include, for example, a connection interval, a slave latency, and a connection supervision timeout. Data communication (a connection event) between the control device 200 and the electronic apparatus 100 is periodically performed, and the connection interval may mean an interval between start points of each communication. The slave latency may indicate the number of times that the slave device is not disconnected even without responding to a connection event periodically occurring. The connection supervision timeout may indicate that the connection is released when there is no valid data transmission/reception for a designated time.

In operation 630, the control device 200 and the electronic apparatus 100 may maintain a connection state 640 between the control device 200 and the electronic apparatus 100 by the connection request packet and the connection response packet exchanged between the control device 200 and the electronic apparatus 100.

Figure 7:
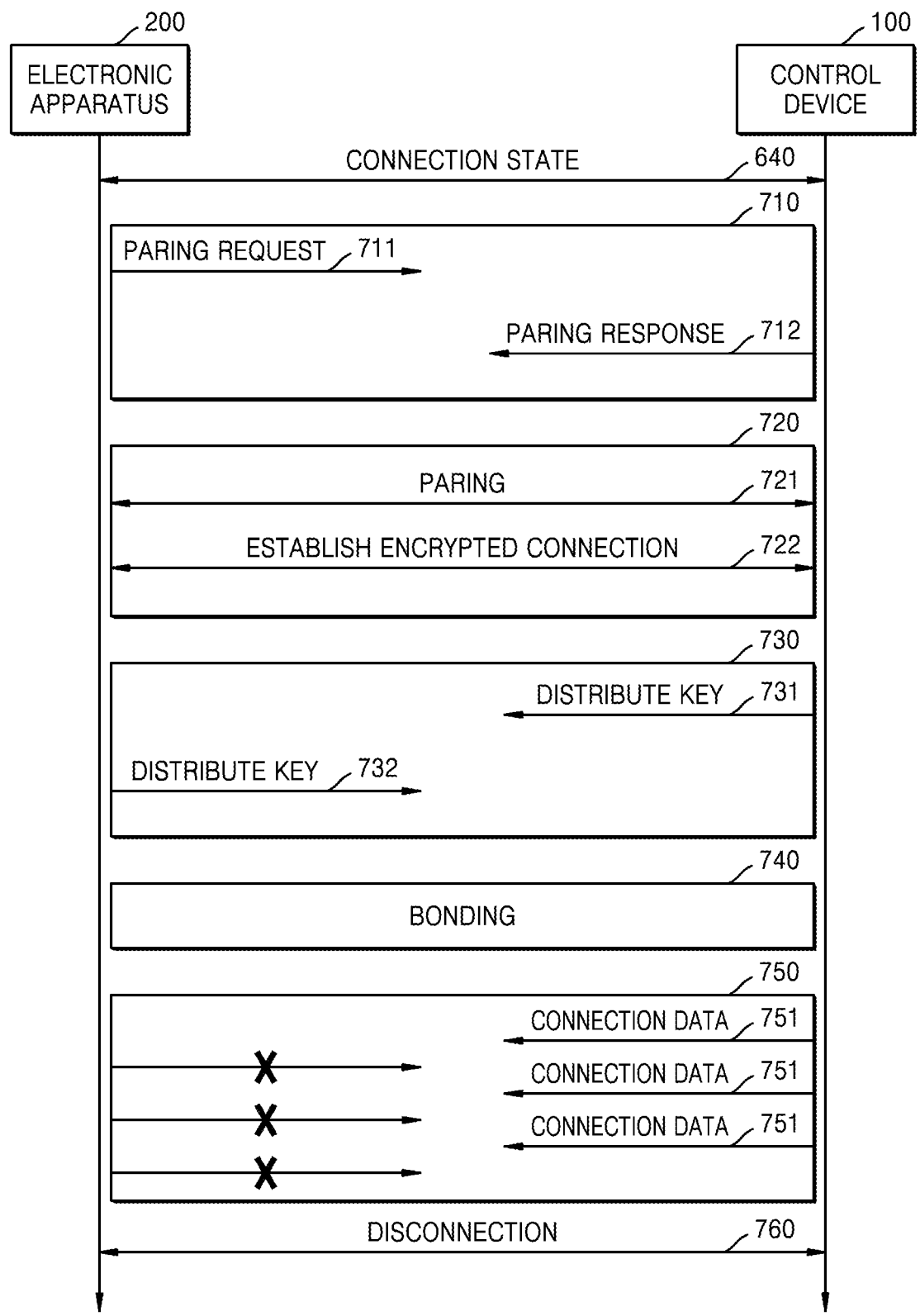
FIG. 7 illustrates a detailed operation from Bluetooth pairing until disconnection between an electronic apparatus and a control device, according to an example embodiment.

FIG. 7 illustrates a detailed operation from Bluetooth pairing until disconnection between the electronic apparatus 100 and the control device 200, according to an example embodiment.

Pairing may refer to a process in which devices exchange necessary information for establishment of encrypted connection. Such pairing may include authenticating identities of two devices to be paired, encrypting a link, and distributing a key for security to be resumed in reconnection. In the pairing process, the devices may exchange a temporary key, and the temporary key may be used to generate a short term key used to encrypt connection.

Referring to FIG. 7, in operation 710, an initiating device, i.e., the control device 200, may send a pairing request 711 to a counterpart device, i.e., the electronic apparatus 100, and the electronic apparatus 100 may transmit a pairing response 712 to the control device 200 in response thereto. The two devices may exchange input/output (I/O) performance, authentication requirements, a maximum encryption key size, and bonding requirements with each other. Basically, this operation is determining how the two devices exchange their performance and establish secure connection.

According to an example embodiment, the electronic apparatus 100 and the control device 200 may identify identification information of a counterpart by providing their information in a pairing request and pairing response process. In this case, when the electronic apparatus 100 recognizes that the control device 200 is a predesignated specific device, the electronic apparatus 100 may determine to transmit a wireless signal of a specific intensity for wireless harvesting charging of the control device 200.

In operation 720, devices may generate and exchange a temporary key using one pairing method. The two devices, i.e., the control device 200 and the electronic apparatus 100 may exchange confirmation and a RAND value for authentication using the same temporary key. Upon completion of the authentication, a short term key may be generated using the temporary key and the RAND value. The short term key may be used to encrypt connection. The pairing method may include Just work, Out of Band, and Passkey. Just work is a method of setting the temporary key to 0 and this method does not provide a way to authenticate devices joining connection. Out of Band exchanges a temporary key by using different wireless techniques such as NFC. Passkey exchanges a temporary key by using a 6-digit number transmitted by the user between the devices. There may be various ways to transmit the number. For example, when one of the devices generates a random 6-digit number and displays the number on the display, the user may read the number and input the number to another device. When pairing 721 is performed by exchange of the temporary key and paring 721 is completed, encrypted connection 722 may be established.

In operation 730, the control device 200 may indicate a key the control device 200 desires to transmit to the electronic apparatus 100 and a key the control device 200 desires to receive from the electronic apparatus 100. In such a key distribution operation, the master and the slave may exchange long term keys 731 and 732 with each other to encrypt reconnection.

In operation 740, each device may store information obtained through a pairing process. This process may be referred to as a bonding process. Through this bonding, the pairing process may quickly perform a connection operation by using stored information in reconnection, without being repeatedly performed every reconnection. Through this bonding process, the control device 200 and the electronic apparatus 100 may recognize each other. When the electronic apparatus 100 may recognize an identifier of the control device 200 and recognize that the control device 200 is a predefined counterpart, the electronic apparatus 100 may determine to perform an operation disclosed in the disclosure for the predefined counterpart, i.e., the control device 200. That is, the electronic apparatus 100 may determine to transmit the wireless signal of the first intensity for power charging of the recognized control device 200. For example, the electronic apparatus 100 may recognize a remote controller having a particular identifier and determine to transmit the wireless signal of the first intensity for power charging of the remote controller through the bonding process with the recognized remote controller.

To maintain the connection state 640, the control device 200 and the electronic apparatus 100 may exchange connection data at connection intervals. However, to exchange formal connection data as such for communication where valid data is not exchanged, the control device 200 needs to consume power, causing waste of power. Thus, the control device 200 according to the disclosed embodiment of the disclosure may not transmit response data to connection data 751 transmitted by the electronic apparatus 100 at specific connection intervals in operation 750, when valid data transmission/reception do not occur. As such, when the control device 200 does not transmit response data, disconnection 760 may be performed by a connection management timeout.

Figure 8:
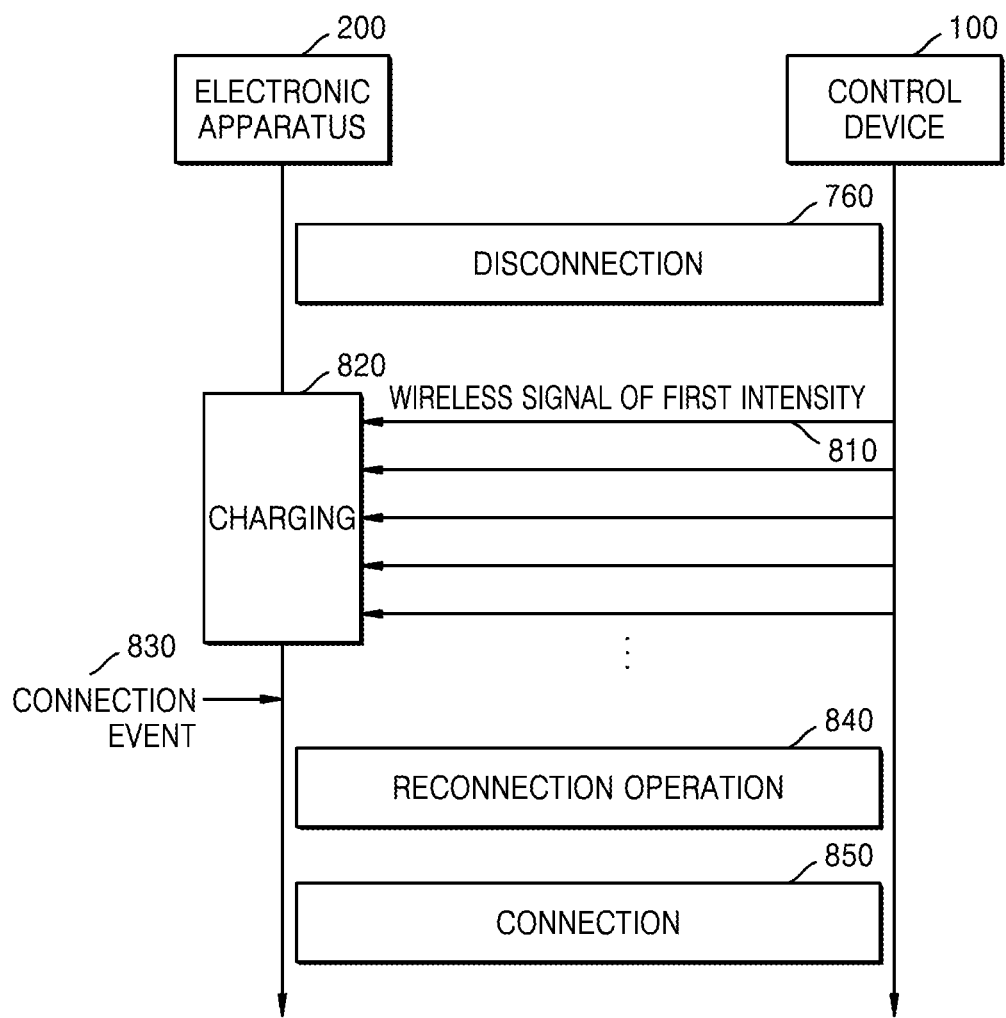
FIG. 8 is a flowchart illustrating an example of a reconnection operation after Bluetooth communication disconnection between an electronic apparatus and a control device, according to an example embodiment.

FIG. 8 is a flowchart illustrating an example of a reconnection operation after Bluetooth communication disconnection between the electronic apparatus 100 and the control device 200, according to an example embodiment.

Referring to FIG. 8, in operation 810, after the disconnection 760, the electronic apparatus 100 may periodically transmit the wireless signal of the first intensity with a specific strength. Transmission of the wireless signal of the first intensity with a specific strength for the control device 200 by the electronic apparatus 100 may be performed by recognition of the control device 200 as a predesignated specific counterpart after Bluetooth pairing with the control device 200, rather than by disconnection from the control device 200.

In operation 820, the control device 200 may collect the wireless signal of the first intensity transmitted from the electronic apparatus 100 and perform harvesting, thereby charging the power of the control device 200. The control device 200 may enter the sleep mode after Bluetooth disconnection from the electronic apparatus 100. The control device 200 having entered the sleep state may collect the wireless signal of the first intensity transmitted from the electronic apparatus 100 to charge the power by using a wireless charging unit.

In operation 830, the control device 200 may receive a connection event. The connection event may include, for example, an event that causes the control device 200 to connect to the electronic apparatus 100 by pressing, by a user of the control device 200, a button provided in the control device 200.

In operation 840, the control device 200 may perform a reconnection operation to the electronic apparatus 100 upon reception of the connection event. The control device 200 and the electronic apparatus 100 store a key for encrypted connection with each other through the pairing and bonding processes as shown in FIG. 7, such that the encrypted connection may be maintained using the stored key through the connection process as shown in FIG. 6.

In operation 850, the control device 200 may establish a communication connection with the electronic apparatus 100 through the Bluetooth reconnection operation.

Figure 9:
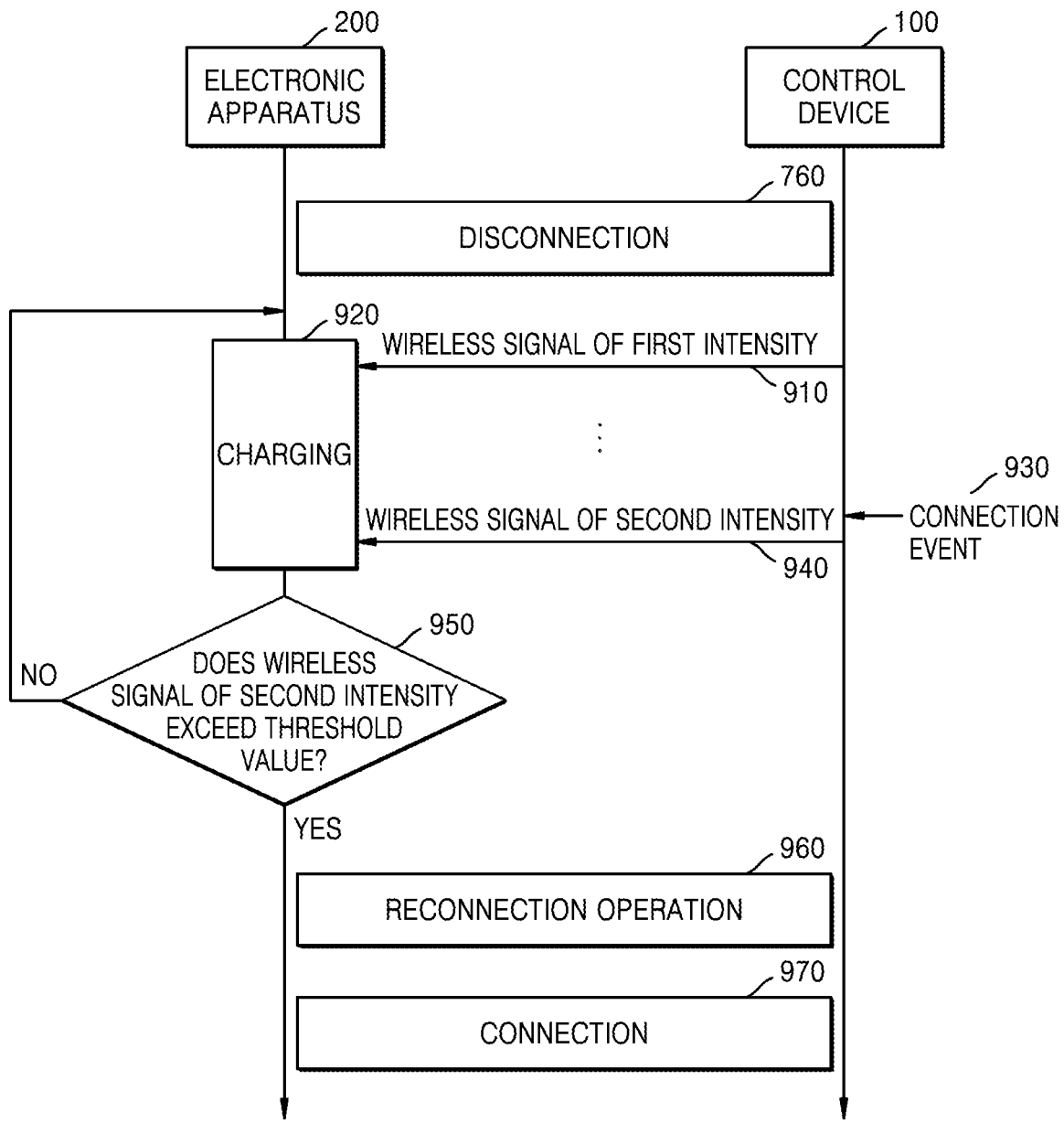
FIG. 9 is a flowchart illustrating an example of a reconnection operation after Bluetooth communication disconnection between an electronic apparatus and a control device, according to an example embodiment.

FIG. 9 is a flowchart illustrating an example of a reconnection operation after Bluetooth communication disconnection between the electronic apparatus 100 and the control device 200, according to an example embodiment.

Referring to FIG. 9, in operation 910, after the disconnection 760, the electronic apparatus 100 may periodically transmit the wireless signal of the first intensity with a specific strength.

In operation 920, the control device 200 may collect the wireless signal of the first intensity transmitted from the electronic apparatus 100 and perform harvesting, thereby charging the power of the control device 200.

In operation 930, the electronic apparatus 100 may detect a connection event. The connection event may include, for example, a user input requesting discovery of the control device 200, etc.

In operation 940, when the electronic apparatus 100 receives the connection event, the electronic apparatus 100 may transmit the wireless signal of the second intensity rather than the wireless signal of the first intensity typically transmitted for power charging of the control device 200.

In operation 950, the control device 200 may determine whether power based on the wireless signal of the second intensity exceeds a threshold value as well as charge the power, by using the wireless signal of the second intensity received via the antenna. As a result of determination, when the power does not exceed the threshold value, the control device 200 may enter the idle state. As a result of determination, when the power based on the wireless signal of the second intensity does not exceed the threshold value, operation 960 may be performed.

In operation 960, the control device 200 may perform a reconnection operation to the electronic apparatus 100. The control device 200 and the electronic apparatus 100 store a key for encrypted connection with each other through the pairing and bonding processes as shown in FIG. 7, such that the encrypted connection may be maintained using the stored key through the connection process as shown in FIG. 6.

In operation 970, the control device 200 may establish a communication connection with the electronic apparatus 100 through the reconnection operation.

Figure 10:
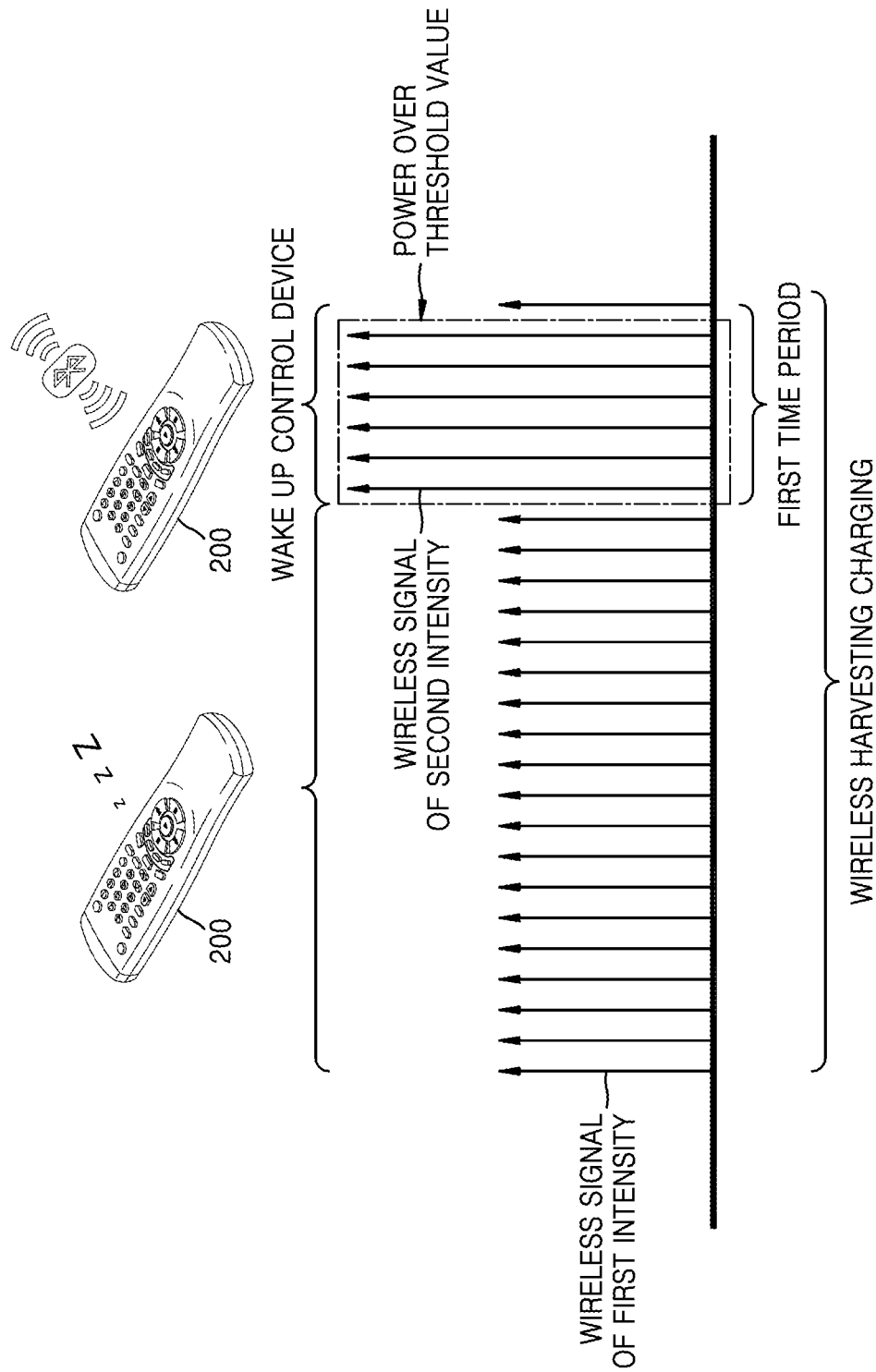
FIG. 10 is a reference diagram for describing a method of waking up a control device by outputting, by an electronic apparatus, a wireless signal of a second intensity, according to an example embodiment.

FIG. 10 is a reference diagram for describing a method of waking up a control device by outputting, by an electronic apparatus, a wireless signal of a second intensity, according to an example embodiment.

Referring to FIG. 10, after the Bluetooth communication pairing of the electronic apparatus 100 and the control device 200, the electronic apparatus 100 may transmit the wireless signal of the first intensity for wireless harvesting charging of the control device 200. After the Bluetooth communication pairing, the control device 200 may release the communication connection and enter the sleep mode when valid data transmission/reception with the electronic apparatus 100 do not occur. The control device 200 having entered the sleep mode may collect the wireless signal of the first intensity received from the electronic apparatus 100 and store power using the wireless harvesting charging technique.

The electronic apparatus 100 may enable the control device 200 to perform wireless harvesting charging by transmitting the wireless signal of the first intensity in the absence of a particular event.

The electronic apparatus 100 may transmit the wireless signal of the second intensity that is stronger than the wireless signal of the first intensity to wake up the control device 200, in the case of needing to perform communication reconnection with the control device 200, i.e., detecting an event for communication reconnection.

In the sleep mode, wireless harvesting charging may be performed using the wireless signal of the first intensity received from the electronic apparatus 100. In addition, the control device 200 may also monitor the power collected by the wireless harvesting charging and determine that the electronic apparatus 100 intends to wake up the control device 200 when the collected power exceeds the threshold value as a monitoring result. The control device 200 may attempt a Bluetooth communication reconnection operation with the electronic apparatus 100 when determining based on power collected during a first time period that the collected power exceeds the threshold value. The first time period may be a time period in which the control device 200 may determine that the collected power exceeds the threshold value.

The electronic apparatus 100 and the control device 200 may be reconnected through the Bluetooth communication reconnection operation.

According to an example embodiment, the electronic apparatus 100 may transmit the wireless signal of the second intensity during a preset time to wake up the control device 200. The preset time may be determined variously. For example, the electronic apparatus 100 may transmit the wireless signal of the second intensity for a predefined time. For example, the electronic apparatus 100 may stop transmission of the wireless signal of the second intensity and start transmission of the wireless signal of the first intensity, when receiving a Bluetooth communication reconnection request from the control device 200. For example, the electronic apparatus 100 may stop transmission of the wireless signal of the second intensity and start transmission of the wireless signal of the first intensity, when Bluetooth communication reconnection with the control device 200 is established. This is because transmission of the wireless signal of the second intensity is intended for the Bluetooth communication reconnection with the control device 200, and when the Bluetooth reconnection request is received from the control device 200, it may mean achievement of the purpose of the electronic apparatus 100, and thus it is not necessary to transmit the wireless signal of the second intensity any longer.

Figure 11:
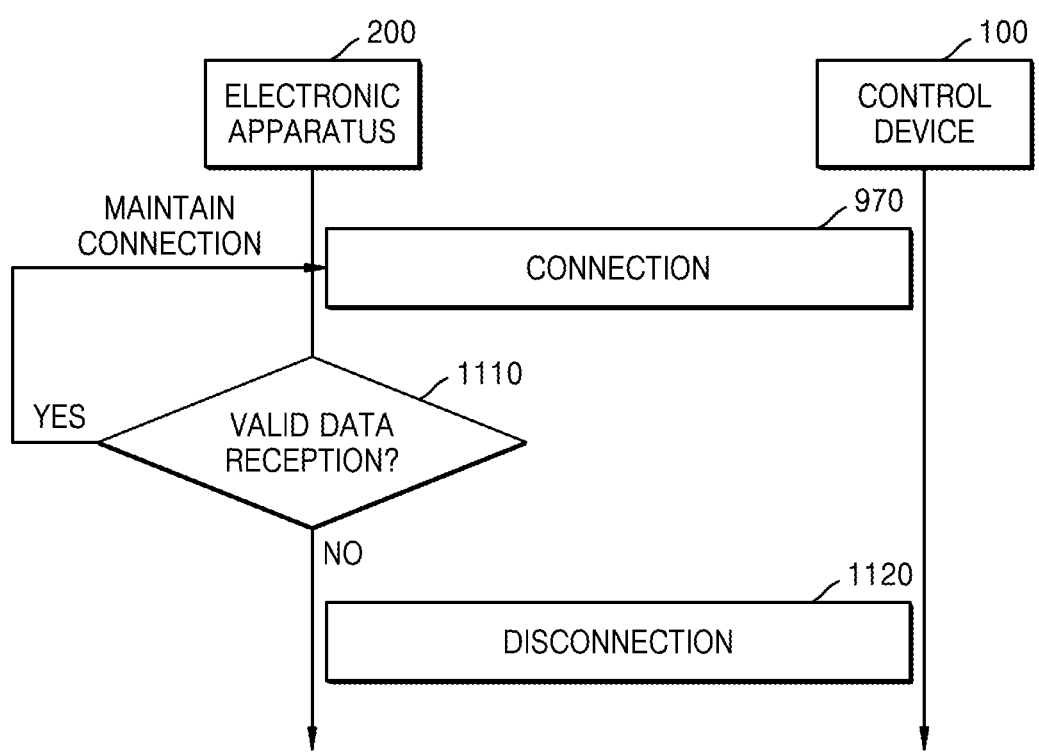
FIG. 11 is a flowchart illustrating an operation after connection to an electronic apparatus when a control device detects power over a threshold value, according to an example embodiment.

FIG. 11 is a flowchart illustrating an operation after connection to an electronic apparatus when a control device detects power over a threshold value, according to an example embodiment.

Referring to FIG. 11, the control device 200 may perform Bluetooth communication reconnection with the electronic apparatus 100 in operation 970, and then the control device 200 may determine whether valid data is received from the electronic apparatus 100 in operation 1110. When it is determined that the control device 200 receives valid data from the electronic apparatus 100 as a determination result, the control device 200 may maintain connection. When it is determined that the control device 200 does not receive valid data from the electronic apparatus 100 as a determination result, the control device 200 may release Bluetooth connection with the electronic apparatus 100 (see step 1120). Such a Bluetooth disconnection operation 1120 may be the same as described with reference to FIG. 7, and thus will not be described. When the control device 200 collects the wireless signal through the antenna for wireless harvesting charging, the wireless signal collected through the antenna may not only be received from the electronic apparatus 100 but may also be collected from various surrounding external devices or sources. Thus, when the control device 200 detects power beyond the threshold value as a result of monitoring the collected power, detection may not necessarily occur due to the wireless signal of the second intensity transmitted by the electronic apparatus 100. Thus, once the monitored power exceeds the threshold value, the control device 200 may attempt Bluetooth communication reconnection with the electronic apparatus 100, taking into account a possibility of occurrence due to an intention to wake up the electronic apparatus 100. Thus, when valid data is not actually received from the electronic apparatus 100 after an attempt for Bluetooth communication reconnection, it may be determined that transmission of the wireless signal of the second intensity by the electronic apparatus 100 originates from a wireless signal from another nearby device rather than from an intention to wake up the electronic apparatus 100, such that the control device 200 may release connection through the Bluetooth reconnection operation.

Some embodiments of the disclosure may be implemented as a recording medium including a computer-executable instruction such as a computer-executable programming module. The computer-readable recording medium may be an available medium that is accessible by a computer, and include all of a volatile medium, a non-volatile medium, a separated medium, and a non-separated medium. The computer-readable recording medium may also include a computer storage medium. The computer storage medium may include all of a volatile medium, a non-volatile medium, a separated medium, and a non-separated medium, which are implemented by a method or technique for storing information such as a computer-readable instruction, a data structure, a programming module, or other data.

Disclosed embodiments of the disclosure may be implemented as a software (S/W) program including an instruction stored in a computer-readable storage media.

The computer may invoke stored instructions from the storage medium and operate based on the invoked instructions according to the disclosed embodiment of the disclosure, and may include an electronic device according to the disclosed embodiments.

The computer-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

The control method according to the disclosed embodiments of the disclosure may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of a S/W program electronically distributed through a manufacturer or the device or an electronic market (e.g., Google Play Store or App Store). For the electronic distribution, at least a portion of the S/W program may be stored in a storage medium or temporarily generated. In this case, the storage medium may be a storage medium of a server in the manufacturer, the electronic market, or a relay server that temporarily stores the S/W program.

The computer program product may include a storage medium of a server or a storage medium of a device, in a system including the server and the device. Alternatively, when there is a third device (e.g., a smart phone) communicating with the server or the device, the computer program product may include a storage medium of the third device. Alternatively, the computer program product may include a S/W program itself, which is transmitted from the server to the device or the third device or transmitted from the third device to the device.

In this case, one of the server, the device, and the third device may execute the computer program product to perform the method according to the embodiments of the disclosure. Alternatively, two or more of the server, the device, and the third device may execute the computer program product to execute the method according to the embodiments of the disclosure in a distributed manner.

For example, a server (e.g., a cloud server or AI server, etc.) may execute a computer program product stored in the server to control the device communicating with the server to perform the method according to the embodiments of the disclosure.

In another example, the third device may execute the computer program product to control the device communicated with the third device to perform the method according the disclosed embodiment. When the third device executes the computer program product, the third device may download the computer program product and execute the downloaded computer program product. Alternatively, the third device may execute a computer program product provided in a preloaded state to execute the method according to the disclosed embodiments of the disclosure.

In the specification, the term "unit" may be a hardware component like a processor or a circuit, and/or a software component executed by a hardware component like a processor.

Those of ordinary skill in the art to which the disclosure pertains will appreciate that the disclosure may be implemented in different detailed ways without departing from the technical spirit or essential characteristics of the disclosure. Accordingly, the aforementioned embodiments of the disclosure should be construed as being only illustrative, but should not be constructed as being restrictive from all aspects. For example, each element described as a single type may be implemented in a distributed manner, and likewise, elements described as being distributed may be implemented as a coupled type.

The scope of the disclosure is defined by the following claims rather than the detailed description, and the meanings and scope of the claims and all changes or modified forms derived from their equivalents should be construed as falling within the scope of the disclosure.

The invention claimed is:
1. An electronic apparatus comprising:
a communication interface;

at least one processor comprising processing circuitry; and
a memory storing one or more instructions which, when executed individually and/or collectively by the at least one processor, controls the electronic device to:
communicate with the control device via a wireless communication connection;
detect that the wireless communication connection is disconnected;
after disconnection with the control device, transmit a wireless signal of a first intensity for power charging of the control device;
based at least on detection of a predetermined event, transmit a wireless signal of a second intensity that is greater than the first intensity to the control device;
in response to the wireless signal of the second intensity exceeding a predefined threshold, receive a communication reconnection request from the control device; and
in response to the communication reconnection request, establish an authenticated communication connection with the control device.

2. The electronic apparatus of claim 1, wherein the wireless signal of the first intensity and the wireless signal of the second intensity are wireless signals corresponding to different communication protocols.

3. The electronic apparatus of claim 2, wherein the wireless signal of the first intensity comprises a Bluetooth signal of the first intensity, and the wireless signal of the second intensity comprises a Wireless Fidelity (WiFi) signal of the second intensity.

4. The electronic apparatus of claim 1, wherein the wireless signal of the first intensity and the wireless signal of the second intensity are wireless signals corresponding to a same communication protocol, and have different intensities.

5. The electronic apparatus of claim 4, wherein the first intensity and the second intensity of the wireless signals are determined by at least one of a strength or a transmission time interval of the wireless signals.

6. The electronic apparatus of claim 5, wherein the wireless signal comprises a Wireless Fidelity (WiFi) signal.

7. The electronic apparatus of claim 1, wherein the predetermined event comprises an event for requesting an operation of a communication reconnection with the control device.

8. A control device comprising:
a communication interface comprising interface circuitry;
a wireless charging unit comprising charging circuitry and/or a coil;
at least one processor comprising processing circuitry; and
a memory storing one or more instructions which, when executed individually and/or collectively by the at least one processor, controls the control device to:
communicate with an electronic device via a wireless communication connection;
detect that the wireless communication connection is disconnected;
after disconnection with the electronic device, receive a wireless signal of a first intensity from the electronic apparatus and control the wireless charging unit to collect the wireless signal of the first intensity and to charge power;
detect that an intensity of the power charged by the wireless charging unit exceeds a threshold value;
based at least on detecting the intensity of the power charged by the wireless charging unit exceeds the threshold value, transmit a communication reconnection request to the electronic apparatus; and
receive a response to the communication reconnection request from the electronic apparatus to establish an authenticated communication connection with the electronic apparatus.

9. The control device of claim 8, wherein the wireless signal of the first intensity and the wireless signal of the second intensity are wireless signals corresponding to different communication protocols.

10. The control device of claim 9, wherein the wireless signal of the first intensity comprises a Bluetooth signal of the first intensity, and the wireless signal of the second intensity comprises a Wireless Fidelity (WiFi) signal of the second intensity.

11. The control device of claim 10, wherein the first intensity and the second intensity of the wireless signals are determined by at least one of a strength or a transmission time interval of the wireless signals.

12. The control device of claim 11, wherein the wireless signal comprises a Wireless Fidelity (WiFi) signal.

13. The control device of claim 11, wherein the memory stores one or more instructions which, when executed individually and/or collectively by the at least one processor, controls the control device to disconnect when there is no valid data transmission/reception after communication connection.

14. The control device of claim 8, wherein the wireless signal of the first intensity and the wireless signal of the second intensity are wireless signals corresponding to a same communication protocol, and have different intensities.

15. An operating method of an electronic apparatus, the operating method comprising:
communicating with the control device via a wireless communication connection;
detecting that the wireless communication connection is disconnected;
after disconnecting with the control device, transmitting a wireless signal of a first intensity for power charging of the control device;
based at least on a predetermined event, transmitting a wireless signal of a second intensity that is greater than the first intensity to the control device;
in response to the wireless signal of the second intensity exceeding a predefined threshold, receiving a communication reconnection request from the control device; and
in response to the communication reconnection request, establishing an authenticated communication connection with the control device.

16. The operating method of claim 15, wherein the wireless signal of the first intensity and the wireless signal of the second intensity are wireless signals corresponding to a same communication protocol, and have different intensities.

17. An operating method of a control device, the operating method comprising:
communicating with an electronic device via a wireless communication connection;
detecting that the wireless communication connection is disconnected;
after disconnection with the electronic device, receiving a wireless signal of a first intensity from the electronic apparatus, collecting the wireless signal of the first intensity, and charging power;

detecting that an intensity of the power charged by the wireless charging unit exceeds a threshold value;

based at least on detecting the intensity of the power charged by the wireless charging unit exceeds the threshold value, transmitting a communication reconnection request to the electronic apparatus; and receiving a response to the communication reconnection request from the electronic apparatus to establish an authenticated communication connection with the electronic apparatus.

18. The operating method of claim 17, wherein the wireless signal of the first intensity and the wireless signal of the second intensity are wireless signals corresponding to a same communication protocol, and have different intensities.

19. A computer-readable recording medium having recorded thereon one or more programs executed by a processor of an electronic apparatus to implement an operating method of the electronic apparatus, the operating method comprising:

communicating with the control device via a wireless communication connection;

detecting that the wireless communication connection is disconnected;

after disconnecting with the control device, transmitting a wireless signal of a first intensity for power charging of the control device;

based at least on a predetermined event, transmitting a wireless signal of a second intensity that is greater than the first intensity to the control device;

in response to the wireless signal of the second intensity exceeding a predefined threshold, receiving a communication reconnection request from the control device; and in response to the communication reconnection request, establishing an authenticated communication connection with the control device.

* * * * *